(12) United States Patent
Kewitsch et al.

(10) Patent No.: US 6,201,909 B1
(45) Date of Patent: Mar. 13, 2001

(54) WAVELENGTH SELECTIVE OPTICAL ROUTERS

(75) Inventors: Anthony S. Kewitsch, Hacienda Heights; George A. Rakuljic, Santa Monica; Amnon Yariv, San Marino, all of CA (US)

(73) Assignee: Arroyo Optics, Inc., Santa Monica, CA (US)

( * ) Notice: Subject to any disclaimer, the term of this patent is extended or adjusted under 35 U.S.C. 154(b) by 0 days.

(21) Appl. No.: 09/210,844

(22) Filed: Dec. 15, 1998

Related U.S. Application Data

(63) Continuation-in-part of application No. 08/738,068, filed on Oct. 25, 1996, now Pat. No. 5,875,272.

(51) Int. Cl.[7] ............................................... G02B 6/34
(52) U.S. Cl. .............................. 385/37; 385/24; 385/16; 385/43; 359/124; 359/127
(58) Field of Search .................................. 385/37, 14–16, 385/24, 25, 27, 28, 34, 31, 39, 43, 42, 46, 48, 50, 96; 359/124, 127, 130

(56) References Cited

U.S. PATENT DOCUMENTS

| | | | |
|---|---|---|---|
| 4,737,007 | 4/1988 | Alferness et al. | 385/37 |
| 5,488,500 | 1/1996 | Glance | 359/127 |
| 5,566,014 | 10/1996 | Glance | 359/124 |
| 5,600,473 | 2/1997 | Huber | 385/10 X |
| 5,712,932 | 1/1998 | Alexander et al. | 385/24 |
| 5,748,349 | 5/1998 | Mizrahi | 385/37 X |
| 5,778,118 | 7/1998 | Sridhar | 385/24 |
| 5,786,914 | 7/1998 | Fielding | 385/24 |
| 5,875,272 | * 2/1999 | Kewitsch et al. | 385/37 |

OTHER PUBLICATIONS

"Enhanced Wavelength Tuning in Grating–Assisted Codirectional Coupler Filter", Z.M. Chuang & L.A. Coldren, IEEE Photonics Technology Letters, vol. 5, No. 10, Oct. 1993, pp. 1219–1221.

"2×2 Single–mode fiber routing switch", T.A. Birks, D.O. Culverhouse, S.G. Farwell, & P. St. J. Russell, Optics Letters, vol. 21, No. 10, May 15, 1996; pp. 722–724.

"Grating–frusted coupler: a novel channel–dropping filter in single–mode optical fiber", J.–L. Archambault, P. St. J. Russell, S. Barcelos, P. Hua, and L. Reekie, Optics Letters, vol. 19, No. 3, Feb. 1, 1994; pp. 180–182.

"An All–Fiber Dense–Wavelength–Division Multiplexer/ Demultiplexer Using Photoimprinted Bragg Gratings", F. Bilodeau, D.C. Johnson, S. Theriault, B. Malo, J. Albert, & K.O. Hill, IEEE Photonics Technology Letters, vol. 7, No. 4, Apr. 1995; pp. 388–390.

(List continued on next page.)

Primary Examiner—Phan T. H. Palmer
(74) Attorney, Agent, or Firm—Jones, Tullar & Cooper, P.C.

(57) ABSTRACT

Using the wavelength selectivity and low loss characteristics of optical couplers, in which index of refraction gratings in a non-evanescent waveguide merged region reflect only a selected wavelength band, signal switching and control systems of novel characteristics are provided for multi-wavelength optical communication systems. In a router, for example, selected wavelengths or wavelength bands on an add/drop line can be added to or dropped from a main fiber, by cross switching between wavelength selective loops disposed sequentially in the lines. In a collector box, as another example, selected wavelength bundles can be routed from one fiber onto multiple fibers. In a bandpass filter a selected wavelength band is transmitted with low loss while those wavelengths outside the selected wavelength band are rejected with very high loss.

38 Claims, 11 Drawing Sheets

OTHER PUBLICATIONS

"Four channel fibre grating demultiplexer", V. Mizrahi et al., Electronics Letters, vol. 30, No. 10, May 12, 1994; pp. 780–781.

"Silica–based arrayed–waveguide grating circuit as optical splitter/router", by Y. Inoue et al., Electronic Letters, vol. 31, No. 9, pp. 723–724 (1995).

"16–channel optical add/drop multiplexer using silica–based arrayed–waveguide gratings", by K. Okamoto et al., Electronic Letters, vol. 32, No. 16, pp. 1471–1472 (1996).

"Review & Status of Wavelength–Division–Multiplexing Technology & Its Application", by Hideki Ishio et al., Journal of Lightwave Technology, vol. LT–2, No. 4, Aug. 1984, pp. 448–463.

"Optical wavelength add–drop multiplexer in installed submarine WDM network", by K.P. Jones et al., Electronic Letters, vol. 31, No. 24, Nov. 23, 1995, pp. 2117–2118.

"Optical add/drop multiplexer based on UV–written Bragg grating in a fused 100% coupler", by F. Bakhti et al., Electronic Letters, vol. 33, pp. 803–804 (1997).

"Reconfigurable 16 Channel WDM DROP Module Using Silicon MEMS Optical Switches", by C.R. Giles et al., IEEE Photonics Technology Letters, vol. 11, No. 1, Jan. 1999, pp. 63–65.

"Interferometric Crosstalk–Free Optical Add/Drop Multiplexer Using Mach–Zehnder–Based Fiber Gratings", by Takashi Mizuochi et al., Journal of Lightwave Technology, vol. 16, No. 2, Feb. 1998, pp. 265–276.

"Compact All–Fiber Add–Drop–Multiplexer Using Fiber Bragg Gratings", by Ingolf Baumann et al., IEEE Photonics Technology Letters, vol. 8, No. 10, Oct. 1996, pp. 1331–1333.

"All–Fiber Active Add–Drop Wavelength Router", by G. Nykolak et al., vol. 9, No. 5, May 1997, pp. 605–606.

"Waveguide grating router with maximally flat passband produced by spatial filtering", by C. Dragone et al., vol. 33, No. 15, Jul. 1997, pp. 1312–1314.

"Bandwidth Optimization of Optical Add/Drop Multiplexers Using Cascaded Couplers & Mach–Zehnder Sections", by C. Kostrzewa et al., vol. 7, No. 8, Aug. 1995, pp. 902–904.

"Efficient Techniques for Widening the Passband of a Wavelength Router", by C. Dragone et al., vol. 16, No. 10, Oct. 1998, pp. 1895–1906.

* cited by examiner

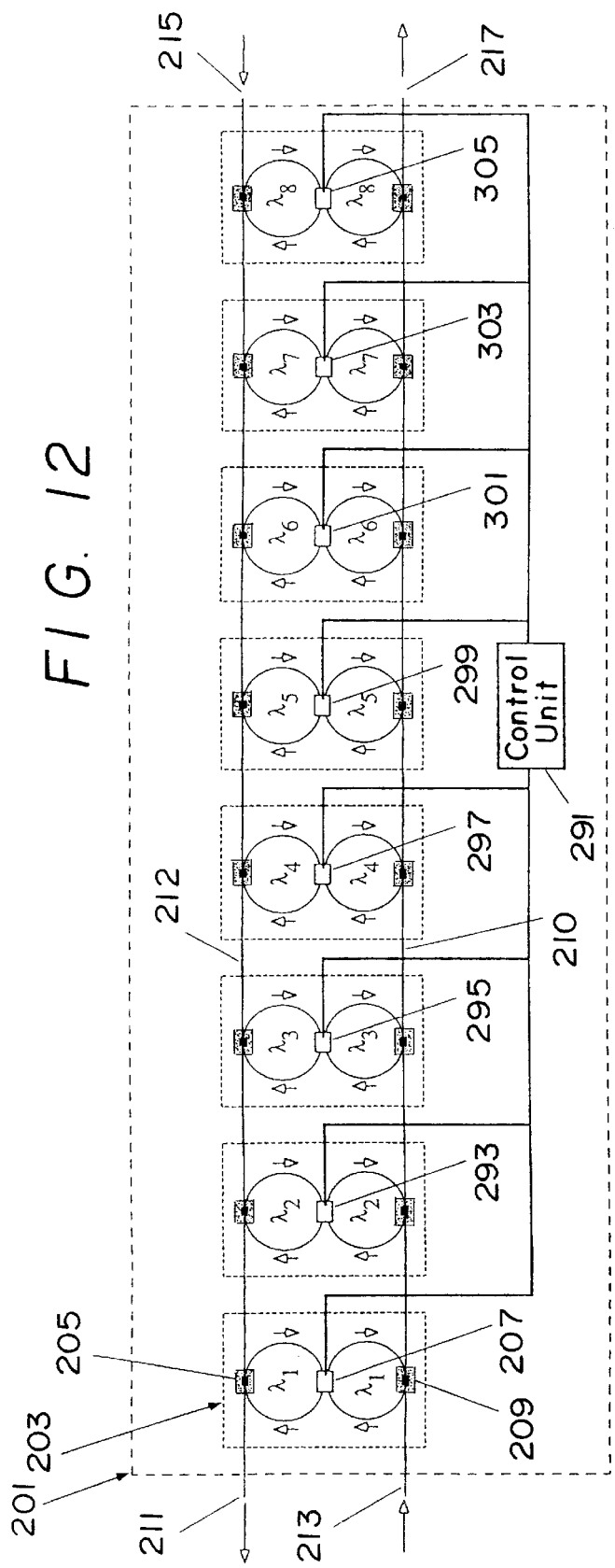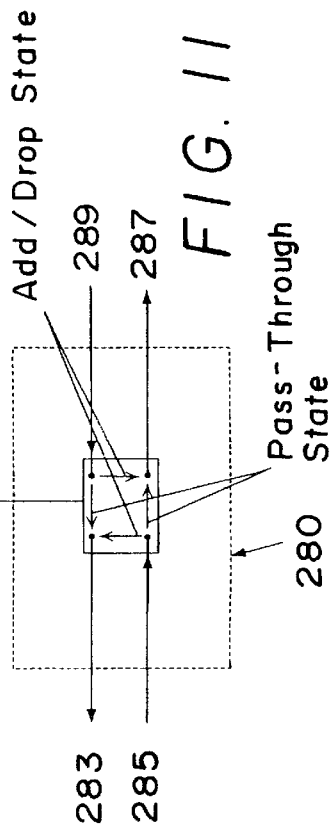

WAVELENGTH SELECTIVE OPTICAL ROUTERS

REFERENCE TO RELATED APPLICATIONS

The present application is a Continuation-in-Part of application Ser. No. 08/738,068, filed Oct. 25, 1996 now U.S. Pat No. 5,875,272.

FIELD OF THE INVENTION

The present invention relates to the communication of signals via optical fibers, and particularly to systems for routing and switching optical signals based on wavelength selectivity. More particularly, the invention relates to optical devices and subsystems using wavelength selective optical couplers.

DESCRIPTION OF RELATED ART

Low loss, wavelength selective couplers are important components for optical fiber communication networks based on wavelength division multiplexing (WDM). WDM enables an individual optical fiber to transmit several channels simultaneously, the channels being distinguished by their center wavelengths. An objective is to provide a precise wavelength selective coupler that is readily manufactured and possesses high efficiency and low loss.

Optical fiber gratings reported in the prior art typically operate in reflection mode. To gain access to this reflected mode in a power efficient manner is difficult, because the wave is reflected backwards within the same fiber. A first method to access this reflected light is to insert a 3 dB coupler before the grating, which introduces a net 6 dB loss on the backwards reflected and out-coupled light. A second method is to insert an optical circulator before the grating to redirect the backwards propagating mode into another fiber. This circulator introduces an insertion loss of 1 dB or more and involves complicated bulk optic components. A method to combine the filtering function of a fiber grating with the splitting function of a coupler in a low loss and elegantly packaged manner would be highly desirable for WDM communication networks.

Another method well known in the prior art uses directional coupling to transfer energy from one waveguide to another by evanescent coupling (D. Marcuse, "Theory of Dielectric Waveguides," Academic Press 1991 and A. Yariv, "Optical Electronics," Saunders College Publishing, 1991). This evanescent coupling arises from the overlap of the exponential tails of the modes of two closely adjacent waveguides, and is the typical mode of operation for directional coupler based devices. In contrast, non-evanescent coupling occurs when the entire optical modes substantially overlap, as is the case when the two waveguides are merged into a single waveguide. Devices that rely on evanescent coupling (e.g., directional couplers) in contrast to non-evanescent coupling have inherently weaker interaction strengths.

One realization of a directional coupling based device uses gratings recorded in a coupler composed of two identical polished fibers placed longitudinally adjacent to one another (J. -L. Archambault et al., Optics Letters, Vol. 19, p.180 (1994). Since the two waveguides are identical in the coupling region, both waveguides possess the same propagation constant and energy is transferred between them. This results in poor isolation of the optical signals traveling through the two waveguides, because optical power leaks from one fiber to the other. Another device also based on evanescent coupling was patented by E. Snitzer, U.S. Pat. No. 5,459,801. The length of the coupling region for this device should be precisely equal to an even or odd multiple of the mode interaction length for the output light to emerge entirely in one of the two output ports. A precisely positioned Bragg grating is then UV recorded in the cores of the waist region.

An alternative grating assisted directional coupler design reported by R. Alferness et al., U.S. Pat. No. 4,737,007 and M. S. Whalen et al., Electronics Letters, Vol. 22, p. 681 (1986) uses locally dissimilar optical fibers. It also is based on evanescent coupling. A serious drawback of this device is that the wavelength for which light is backwards coupled into the adjacent fiber is very close to the wavelength for which light is backreflected within the original fiber (about 1 nm). This leads to undesirable pass-band characteristics that are ill suited for add/drop filter devices designed to add or drop only one wavelength. The separation between the backreflected and backwards coupled wavelengths is impractically small (<2 nm) for the all-fiber, grating assisted directional coupler approaches of the prior art.

The conventional grating assisted directional coupler suffers from both a relatively low coupling strength and small wavelength separation of back-reflected and backwards coupled light. These problems arise because the two coupled optical waveguides remain physically separate and the light remains guided primarily in the original cores. Only the evanescent tails of the modes in each of the two waveguides overlap, corresponding to evanescent coupling. Two locally dissimilar optical fibers can instead be fused and elongated locally to form a single merged waveguide core of much smaller diameter, forming a mode coupler. The resulting optical mode propagation characteristics are effectively those of a multimode silica core/air cladding waveguide. The two waveguides are merged such that the energy in the original optical modes of the separate waveguides interact in a substantially non-evanescent manner in the merged region. The index profile of the optical waveguide varies sufficiently slowly in the longitudinal direction such that light entering the adiabatic taper region in a single eigenmode of the waveguide evolves into a single local supermode upon propagating through the adiabatic transition region. By merging the waveguides into a single wave propagation region, the wavelength selective coupling achieved upon the subsequent recording of an index of refraction grating in the waist of the coupler can be substantially increased. This device is called a grating assisted mode coupler, and is described at length in U.S. Pat. No. 5,805,751.

Add/drop multiplexers and demultiplexers are important functional elements in fiberoptic networks implementing wavelength division multiplexing and wavelength selective routing. A programmable, wavelength selective optical router that can exchange channels between different optical fibers is a critical element of such a network. Furthermore, collector boxes that bundle and distribute, according to wavelength, large numbers of wavelength channels from one fiber to a number of fibers are necessary to efficiently route the signal to the desired destination. For example, a collector box may be configured to separate 32 wavelength channels traveling along a single fiber into 4 groups of 8 sequential channels traveling along 4 fibers. As such, a collector box is a specialized form of wavelength demultiplexer.

Wavelength selective routers of the prior art typically use combinations of optical switches and wavelength demultiplexers/multiplexers. The optical switches are typically mechanical type switches with a response time of 10 ms and an insertion loss of 0.5 dB. Faster electrooptic, acoustooptic or thermal switches can also be used, however, these devices usually exhibit insertion losses in excess of 3 dB. The wavelength demultiplexers/multiplexers typically use components such as arrayed waveguide gratings (AWG's), fiber gratings and circulators, or thin film interference filters. AWG's suffer from large insertion loss, typically >6 dB per device. Fiber gratings and circulators offer high isolation and low crosstalk at the expense of large insertion loss, typically 2 dB per channel. Thin film interference filters offer relatively low loss ( 1 dB), but do not offer the crosstalk (<−25 dB) and isolation (>30 dB) performance necessary for high channel density WDM (<200 GHz channel spacing).

A wide range of add/drop multiplexer and router technologies have been described in the prior art, but each approach suffers from relatively high insertion loss as the number of channels is scaled up. That is, loss does not increase gracefully as the number of channels increases. This additional loss necessitates further amplification of the optical signals passing through the router, increasing the cost and limiting their appeal in networks incorporating a high level of wavelength routing. Examples of such devices are describe in U.S. Pat. Nos. 5,488,500 and 5,566,014 utilizing a combination of optical switches and AWGs. A. Fielding in U.S. Pat. No. 5,786,914 describes a WDM add/drop filter module based on a Mach-Zehnder interferometer. D. Huber describes optical transmission systems that offer add/drop multiplexing assembled from combinations of fiber gratings and circulators in U.S. Pat. No. 5,600,473. B. Sridhar describes an add/drop multiplexer composed of combinations of fiber gratings, circulators, isolators, and fused couplers in U.S. Pat. No. 5,778,118. A dynamically reconfigurable WDM router utilizing optical switches, fiber gratings and circulators is described in U.S. Pat. No. 5,712,932. A unidirectional add/drop filter module combining fiber gratings, a circulator, isolator, and 50/50 coupler is described in U.S. Pat. No. 5,748,349. None of these routers and multiplexers utilize grating assisted mode couplers, and as a result do not benefit from the low loss, high rejection, low crosstalk, and bidirectionality offered by the mode coupler component. These properties enable novel configurations and designs for add/drop multiplexers and routers for WDM.

GLOSSARY

An "active" optical device is a device whose optical properties change in response to an electrical input;

A "passive" optical device is a device lacking an electrical input which affects a change in optical properties;

An "optical fiber" herein is an elongated structure of nominally circular cross section comprised of a "core" of relatively high refractive index material surrounded by a "cladding" of lower refractive index material, adapted for transmitting an optical mode in the longitudinal direction;

A "waveguide" herein is an elongated structure comprised of an optical guiding region of relatively high refractive index transparent material (the core) surrounded by a material of lower refractive index (the cladding), the refractive indices being selected for transmitting an optical mode in the longitudinal direction. This structure includes optical fiber and planar waveguides;

An "add/drop filter" is an optical device which directs optical energy at a particular set of wavelengths from one waveguide into another waveguide;

A "grating" herein is a region wherein the refractive index varies as a function of distance in the medium. The variation typically, but not necessarily, is such that the distance between adjacent index maxima is constant;

The "bandwidth" of a grating is the wavelength separation between those two points for which the reflectivity of grating is 50% of the peak reflectivity of the grating;

A "coupler" herein is a waveguide composed of two or more fibers placed in close proximity of one another, the proximity being such that the mode fields of the adjacent waveguides overlap to some degree;

A "waist" herein refers to that portion of an elongated waveguide with minimum cross sectional area;

An "asymmetric coupler" herein is a structure composed of two or more waveguides that are dissimilar in the region longitudinally adjacent to the coupling region;

A "transversely asymmetric" grating is an index of refraction grating in which the index variation as a function of distance from the central axis of the waveguide along a direction perpendicular to the longitudinal axis is not identical to the index variation in the opposite direction, perpendicular to the longitudinal axis. A transversely asymmetric grating possesses grating vector components at nonzero angles to the longitudinal axis or mode propagation direction of the waveguide. Orthogonal modes are not efficiently coupled by a transversely symmetric grating;

A "supermode" is the optical eigenmode of the complete, composite waveguide structure.

SUMMARY OF THE INVENTION

Couplers of the type having paired terminals at each end of a narrowed merged waist region of nonevanescent characteristics, with coupling achieved by a grating in the waist region, are useful in novel systems and devices in accordance with the invention. These systems, devices and methods take advantage of the low insertion loss, precise wavelength selectivity, bidirectional characteristics and multi-terminal configuration of the couplers, to provide capabilities not heretofore realized.

A signal switching or redistribution system for controlling the separation and propagation of selected wavelengths within a multi-wavelength system is based upon grating enhanced couplers which have multiple terminals and are wavelength selective. The couplers reflectively divert a discrete signal wavelength or a plurality of adjacent wavelengths from a pass-through path without significant loses. Thus, a number of the couplers can be used in serial or parallel sets along or with a multi-wavelength line in a static circuit wherein different wavelengths are differently diverted or in a dynamic system under control commands.

In one example of a wavelength selective transmission system for optical wavelengths, specifically a router, grating enhanced couplers are arranged in switch control sets serially displaced between a main transmission line for multiple discrete wavelengths and an add/drop line for eliminating and inserting individual discrete wavelengths. Propagation along the two lines is in opposite directions, and couplers are serially arranged along each line, with each coupler in one line being paired with a coupler in the other line of like wavelength selectivity. These paired couplers are linked in three element sets with individual optical switches operated by a router control system. Each optical switch is coupled in a separate loop. Terminals of a different coupler, depending upon its switching status, can return the selected wavelength signal to the line from which it came, or to the opposite line. Thus, add signals on the add/drop line can be selectively combined at a given set into the common line for multiple wavelength signals, or a given wavelength in the multiple wavelength line can be dropped to the add/drop line.

By this arrangement, with signals propagating in opposite directions, a given wavelength in the multiple wavelength line can be dropped and a signal at the same wavelength, containing different transmission signals, can be added along the multiple wavelength transmission line. In a variant of this system, the switching sets are cross connected, such that a given wavelength is propagated through the same number of couplers regardless of the wavelengths chosen, assuring excess loss uniformity.

The couplers can also be configured to have a bandwidth selectivity that encompasses a number of discrete but adjacent wavelengths. Consequently, the router function can be accomplished using bundles of discrete wavelengths, rather than individual discrete wavelengths. In addition, in accordance with the invention, this function can be employed in providing a "collection box" which can be used to multiplex and/or demultiplex groups of wavelengths, thus enabling a wide wavelength band to be manipulated by establishing a hierarchy of different wavelength separations. To this end, the couplers are configured with gratings which are substantially uniformly reflected for a set of adjacent individual wavelengths. Preferably, the coupler bandwidth response includes sharp cut-off characteristics at the edges of the bandpass, such that the add/drop reflectivity response is less than −25 dB for wavelengths 1 nanometer outside the add/drop band of 2–10 nanometers. The sequentially adjacent add/drop bands thus can be separated by less than 1 nanometer. A number of such wavelength selective couplers spaced at adjacent wavelengths can demultiplex a total spectral bandwidth into individual wavelength bands densely spaced so that they are responsive over more than 75% of the total spectral bandwidth. Using such couplers, a number of adjacent discrete wavelengths in an optical transmission system can be bundled together in a multi-wavelength system. For example, a bandpass filter of 6.6 nm bandpass has less than −0.5 dB loss within the band and a 7 nm bandpass at the −25 dB level, so that a wide spectral band can be subdivided with a virtual minimum of non-usable deadband.

Couplers in accordance with the invention are written with varying amplitude characteristics in the periodic index of refraction patterns to provide both distributed wavelength response (chirping) and rapid spectral roll-off characteristics (apodization).

Although the grating enhanced couplers with opposite terminal pairs operate by wavelength responsive reflection, they have very low insertion loss and reflect a selected part or all of an incoming single or multi-wavelength signal to the paired terminal at one end of the waist region. Accordingly, with appropriately chosen grating characteristics, they function as a bandpass filter for an individual wavelength or a bundle of wavelengths, other incoming wavelengths being propagated through the waist region to an opposite terminal for dissipation by an optical energy absorber.

BRIEF DESCRIPTION OF THE DRAWINGS

The present invention will be described with reference to the drawings of the following figures:

FIG. 11 shows a 2×2 optical crossover switch;

FIG. 12 shows an eight-channel programmable router;

DETAILED DESCRIPTION OF THE INVENTION

Optical fibers carry signals in the form of modulated light waves from a source of data, the transmitter, to a recipient of data, the receiver. Once light enters this optical fiber, it travels undisturbed unless an optical coupler is inserted at some location along the fiber. Optical couplers allow light signals to be transferred between normally independent optical waveguides.

If multiple signals at different wavelengths travel down the same fiber, it is desirable to transfer a signal at only a predetermined set of wavelengths to or from this fiber into another fiber. These devices are called wavelength selective optical couplers. A desirable attribute of such a wavelength selective optical coupler is that it remains transparent to all wavelengths other than those to be coupled. This transparency is quantified by the insertion loss, crosstalk, and bandwidth. Wavelength selective couplers of the prior art are not adequately transparent for many important applications. The grating assisted mode coupler is a fundamentally transparent device. It transfers light signals from one fiber to another at only a predefined, precise set of wavelengths. It intrinsically is a bidirectional, 4 port device that serves as both an add and drop filter. This great functionality allows an entirely new class of active optical devices and subsystems to be built around it.

Figure 1:
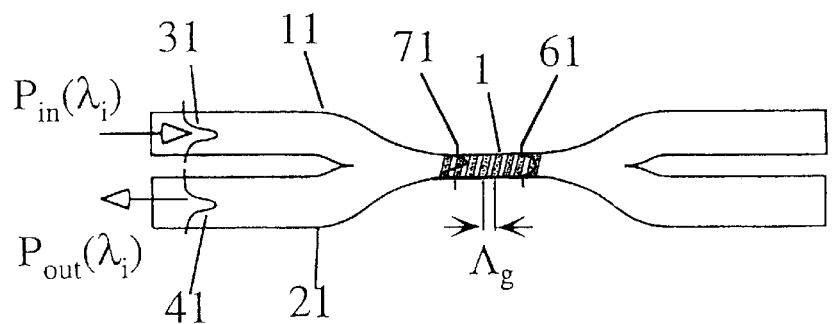
FIG. 1 shows the operation of a grating assisted mode coupler tuned to the Bragg wavelength.
Figure 2:
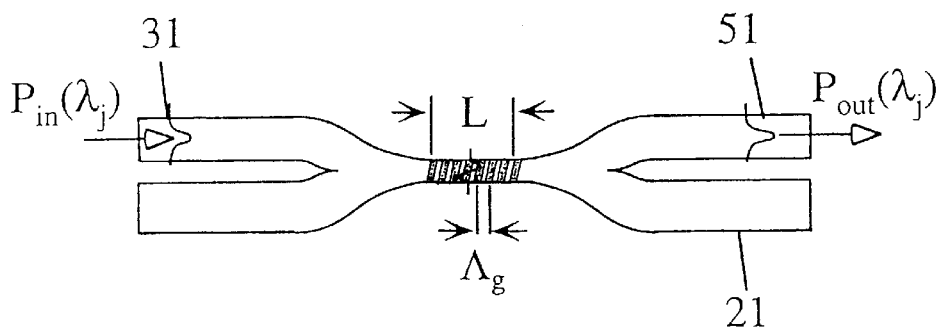
FIG. 2 shows the operation of a grating assisted mode coupler detuned from the Bragg wavelength.

The present invention provides wavelength selective optical devices and subsystems using one or more grating assisted mode couplers. In accordance with the present invention, light is coupled between two or more locally dissimilar waveguides by an index of refraction grating in the shared coupling region of the grating assisted mode coupler. The grating assisted mode coupler can be fabricated by fusing together two optical fibers, or by fabricating the structure in a planar waveguide device. FIGS. 1 and 2 illustrate the operating principle of this device. The mode coupler consists of a first waveguide 11 and a second waveguide 21 dissimilar in the vicinity of the coupling region 1 wherein an index of refraction grating has been impressed. The two waveguides are dissimilar upon entering the coupling region to provide the necessary coupler asymmetry. The input mode 31 with propagation vector $\beta_1$ evolves into the coupler waist mode 71 with propagation vector $\beta_1$, and the backwards propagating waist mode 61 with propagation vector $\beta_1$, evolves into the output mode 41 with propagation vector $\beta_2$. The propagation vectors $\beta_1$ and $\beta_2$ at the waist satisfy the Bragg law for reflection from a thick index grating of period $\Lambda_g$ at a particular wavelength, say $\lambda_i$:

$$\beta_1(\lambda_i)-\beta_2(\lambda_i)=2\pi/\Lambda_g,$$

then the optical energy at $\lambda_i$ in the first waveguide 11 is coupled into the backward propagating mode of the second waveguide 21 (FIG. 1). The spectral response and efficiency of this reflective coupling process is dictated by the coupling strength and the interaction length of the optical modes with the grating.

In FIG. 2, the wavelength of the input mode is detuned, say to $\lambda_j$, so that $\beta_1(\lambda_j)-\beta_2(\lambda_j)\neq 2\pi\Lambda_g$, and the input mode 31 in the first waveguide travels through the coupler waist and reappears as the transmission output mode of the first waveguide 51, as seen in FIG. 2, with minimal leakage into the second waveguide 21. Therefore, only a particular wavelength $\lambda_i$ is coupled out of the first waveguide 11, as determined by the grating period in the coupling region 1. The amount of wavelength detuning required to reduce the reflective coupling by 50% is given by the full-width-half-maxima (FWHM) bandwidth $\Delta\lambda$ of the grating:

$$\Delta\lambda \approx \frac{\Lambda_g \lambda_o}{L_{\mathit{eff}}},$$

where $L_{\mathit{eff}}$ is the effective interaction length of the optical beam and the grating, which may be less than the physical length L of the grating for strong interactions. The bandwidth of reflection gratings is narrower than that of transmission gratings by typically ten to fifty times because the grating period $\Lambda_g$ is much shorter for the former. The narrower frequency response in the reflection mode is desirable for dense WDM applications. Typically, the desired bandpass is approximately 1.0 to 0.2 nm centered on one of the following standard wavelengths for WDM adopted by the International Telecommunications Union (ITU), listed in TABLE 1 below. These wavelengths are the standard channels for 100 GHz WDM systems. 200 GHz systems skip every other channel, and 50 GHz systems place a channel between each of the above wavelengths. To reduce crosstalk between channels the grating function (the ac and dc index of refraction modulations) should be apodized in a manner that reduces the band cutoff overlap at adjacent channels to less than −25 dB.

TABLE 1

| Wavelength (nm) | Frequency (THz) | Wavelength (nm) | Frequency (THz) |
|---|---|---|---|
| 1530.334 | 195.9 | 1547.715 | 193.7 |
| 1531.116 | 195.8 | 1548.515 | 193.6 |
| 1531.898 | 195.7 | 1549.315 | 193.5 |
| 1532.681 | 195.6 | 1550.116 | 193.4 |
| 1533.465 | 195.5 | 1550.918 | 193.3 |
| 1534.250 | 195.4 | 1551.721 | 193.2 |
| 1535.036 | 195.3 | 1552.524 | 193.1 |
| 1535.822 | 195.2 | 1553.329 | 193.0 |
| 1536.609 | 195.1 | 1554.134 | 192.9 |
| 1537.397 | 195.0 | 1554.940 | 192.8 |
| 1538.186 | 194.9 | 1555.747 | 192.7 |
| 1538.976 | 194.8 | 1556.555 | 192.6 |
| 1539.766 | 194.7 | 1557.363 | 192.5 |
| 1540.557 | 194.6 | 1558.173 | 192.4 |
| 1541.349 | 194.5 | 1558.983 | 192.3 |
| 1542.142 | 194.4 | 1559.794 | 192.2 |
| 1542.936 | 194.3 | 1560.606 | 192.1 |
| 1543.730 | 194.2 | 1561.419 | 192.0 |
| 1544.526 | 194.1 | 1562.233 | 191.9 |
| 1545.322 | 194.0 | 1563.047 | 191.8 |
| 1546.119 | 193.9 | 1563.863 | 191.7 |
| 1546.917 | 193.8 | | |

In addition to backwards coupling of light into the adjacent waveguide, the grating typically reflects some light back into the original fiber at a different wavelength given by $2\beta_1(\lambda_2)=k_g$. To ensure that $\lambda_2$ is outside the wavelength operating range of interest, the difference between $\beta_1$ and $\beta_2$ is made sufficiently large. The difference increases as the waveguides become more strongly coupled, until the limiting case is reached, for which the waveguide cores are merged into one another. This difference is maximized for small coupler waists, in which $\beta_1$ and $\beta_2$ correspond to the $LP_{01}$ and $LP_{11}$ modes of an air-clad optical waveguide. Furthermore, an appropriate transversely asymmetric grating substantially reduces the coupling strength for back-reflection.

Figure 3:
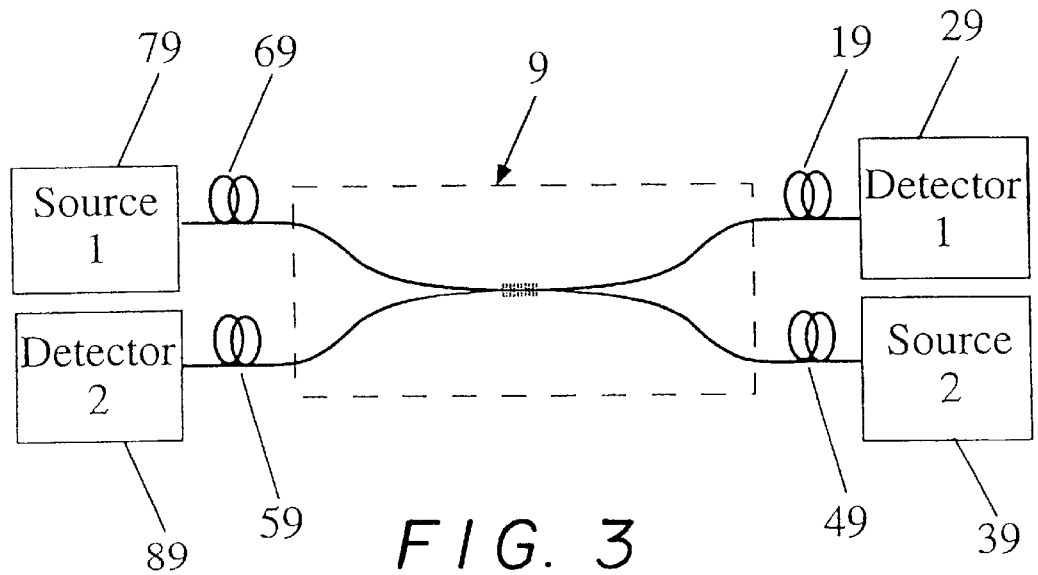
FIG. 3 shows a schematic of a grating assisted mode coupler.

The grating assisted mode coupler 9, illustrated in FIG. 3, redirects optical energy at a particular wavelength from a source 79 to the input optical fiber 69 of the coupler. The period of the index grating formed within the coupler is chosen to redirect only that optical energy within a particular wavelength band into the drop port 59 of a second optical fiber, which travels to detector 89. All other wavelengths propagate through the coupler from the input port 69 to the throughput port 19 attached to detector 29. An additional source of light 39 at the same wavelength can be attached to the add port 49, and will be directed to the throughput port 19 by the same coupler 9. This device performs both the add and drop functions in a single component.

A new class of active fiber optic components and subsystems are made economically and practically feasible by linking other optical devices to this grating assisted mode coupler. This approach enables standard fiber optic components to be rendered wavelength selective by the simple addition of a grating assisted mode coupler. A unique property of the grating assisted mode coupler 9 is the reciprocal property of the inputs and outputs. That is, the input 69—throughput 19 and add 49—drop 59 ports behave in a complementary manner. A single grating assisted mode coupler enables complete bidirectional exchange of optical energy at a particular wavelength from a first waveguide to a second waveguide. This allows important optical devices and subsystems that have been impractical to implement using existing components to be readily achieved with this new, bidirectional device.

EXAMPLE 1

Tunable Grating Assisted Mode Coupler

A passive, grating assisted mode coupler redirects optical energy at a particular, constant center wavelength from one fiber to another. For many applications, it is desirable to change the center wavelength of the grating assisted mode coupler dynamically. To tune a grating assisted mode coupler, the optical properties of the coupler waist can be varied e.g., either the index of refraction or physical shape. The expression for the change in Bragg wavelength of a grating arising from a change in the optical properties (physically arising from a change in the effective index of refraction $\delta n_{eff}$ and a change in grating period $\delta \Lambda_g$) is given by:

$$\delta \lambda_{Bragg} = 2 \Lambda_g \delta n_{eff} + 2 \delta \Lambda_g n_{eff}$$

This tunability can be achieved by physically straining or heating the coupler waist, or by subjecting the coupling region to an external electric field. Because the waist is extremely narrow (typically 15 μm or less), a strain can be readily induced by pulling on one end of the coupler waist. Strain tuning has the predominant effect of changing the grating period by an amount $\delta \Lambda_g$. A relatively small contribution to the Bragg wavelength detuning arises from index changes $\delta n_{eff}$, due to the elastooptic effect. Therefore, the detuning of the Bragg wavelength under an applied strain is approximately given by:

$$\delta \lambda_{Bragg} \approx 2 \Lambda_g \frac{\delta L}{L} n_{eff}.$$

Figure 4:
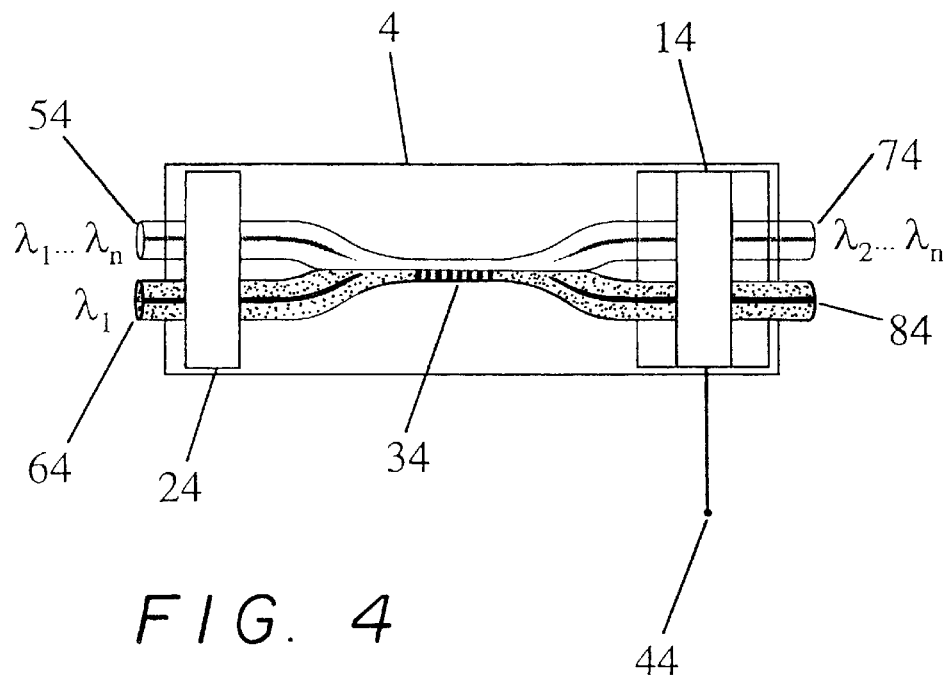
FIG. 4 shows a tunable, grating assisted mode coupler.

This strain may be induced by applying an electrical signal 44 to a movable mount 14 attached to one end of the coupler waist 34, as illustrated in FIG. 4. Strain is induced in the coupler waist 34 by a moving platform 14. The platform 14 may be actuated by a piezoelectric material which elongates or contracts in response to an electrical signal 44. The other end of the coupler is attached to a fixed mount 24.

An alternate method of tuning the grating assisted mode coupler is to vary the external temperature. Approximately 0.1 nm of tuning is achieved for every 10° C. temperature change. Alternately, if the grating assisted mode coupler displays a significant index of refraction change at the coupler waist in response to an optical or electric field, then electrical tuning of the grating assisted mode coupler center wavelength may be achieved through the electrooptic effect. Strain induced tuning is best suited for grating assisted mode couplers fabricated from fused fiber couplers, while field tuning can be implemented readily in a planar waveguide implementation of the grating assisted mode coupler.

EXAMPLE 2

Wavelength Selective Optical Switch

Optical switches can be used to dynamically route information packets from one location to another or to re-configure fiber optical communications networks. These switches are typically based on electrooptic or thermooptic modulation of a directional coupler, Y-branch waveguide or Mach-Zehnder interferometer, and can achieve a modulation bandwidth in excess of 10 Ghz. They are commercially available from E-TEK, Uniphase and Akzo-Nobel, for example. An acoustic optical switch based on a fused asymmetric coupler has been described by Birks et al., Optics Letters Vol. 21, May 1996 (pp. 722–724). Relatively slow (10 ms) mechanical switches are also readily available. However, these switches typically do not allow only one of many wavelengths traveling along an individual fiber to be switched, as is desirable for wavelength routing in WDM networks. That is, these switches are not wavelength selective.

Figure 5:
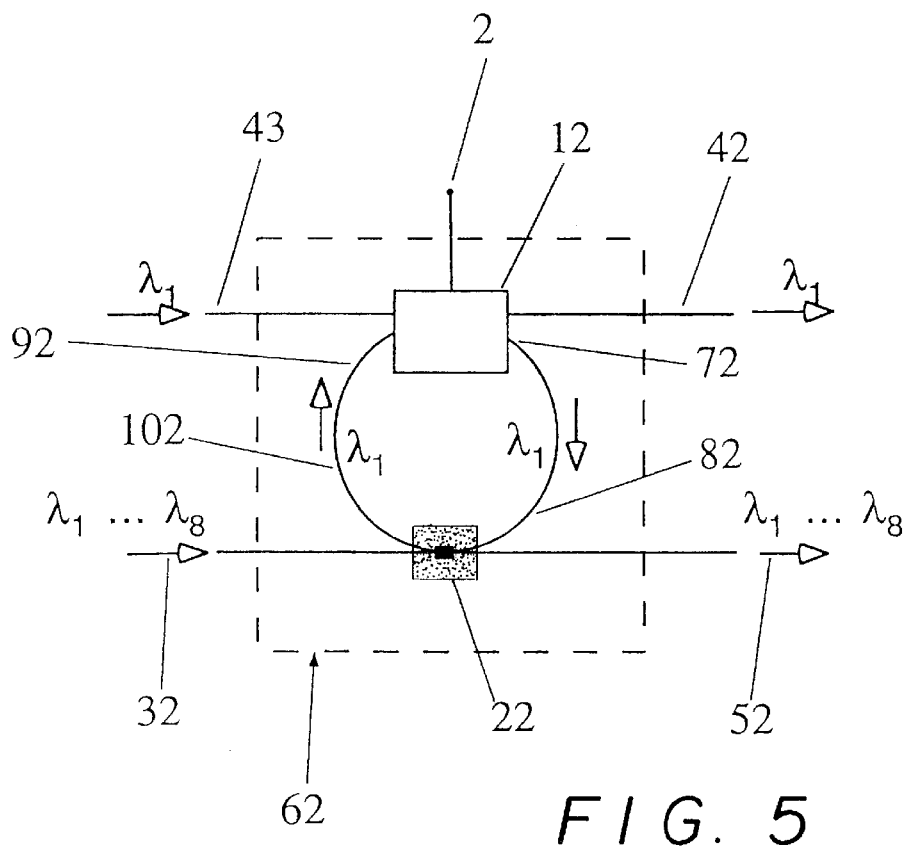
FIG. 5 shows a wavelength selective optical switch.

The grating assisted mode coupler enables a wavelength selective switch to be fabricated with extremely low loss. FIG. 5 schematically illustrates such a device. The optical switch 62 can be practically realized by combining a low loss, grating assisted mode coupler 22 with a standard, wavelength insensitive optical switch 12. The optical switch can be either a 1:2 switch or a 2:2 crossover switch.

If switch 12 is a 1:2 switch, output 43 is absent. In this case, the grating assisted mode coupler 22 routes the channel at $\lambda_1$, for example, from the input port 32 into the drop port 102 attached to the input 92 of the switch. The signal at $\lambda_1$ entering the switch is routed between the output fiber one 42 and two 72, without disturbing the channels at other wavelengths. The electric input signal 2 determines the state of the optical switch. All other wavelengths not equal to $\lambda_1$ travel directly from the input port 32 to the throughput port 52.

Alternately, if switch 12 is a 2:2 crossbar switch, output 43 is present. In this case, the grating assisted mode coupler 22 routes the channel at $\lambda_1$, for example, from the input port 32 into the drop port 102 attached to the input 92 of a standard optical switch. In addition, a channel at $\lambda_1$ can be added, for example, from the add port 43, through the crossover switch 12, into loop 82 and onto the throughput port 52. The electric input signal 2 determines the state of the optical switch. All other wavelengths not equal to $\lambda_1$ travel directly from the input port 32 to the throughput port 52.

The benefits of this wavelength insensitive switch are numerous and commercially important. One obvious advantage is its inherent simplicity. Also, for a WDM optical network, multiple channels at different wavelengths need to be switched independently. If several inevitably lossy optical switches are cascaded, one for each wavelength, the losses accumulate quickly. Therefore, the low loss nature of our device allows wavelengths to be extracted and then added to an optical fiber in a transparent manner. This can isolate lossy elements from the other signals (at other wavelengths) in the fiber. For example, FIG. 5 illustrates that each wavelength travels through only a single optical switch, dramatically reducing the loss per channel.

EXAMPLE 3

Optical Amplifiers for WDM

Figure 6:
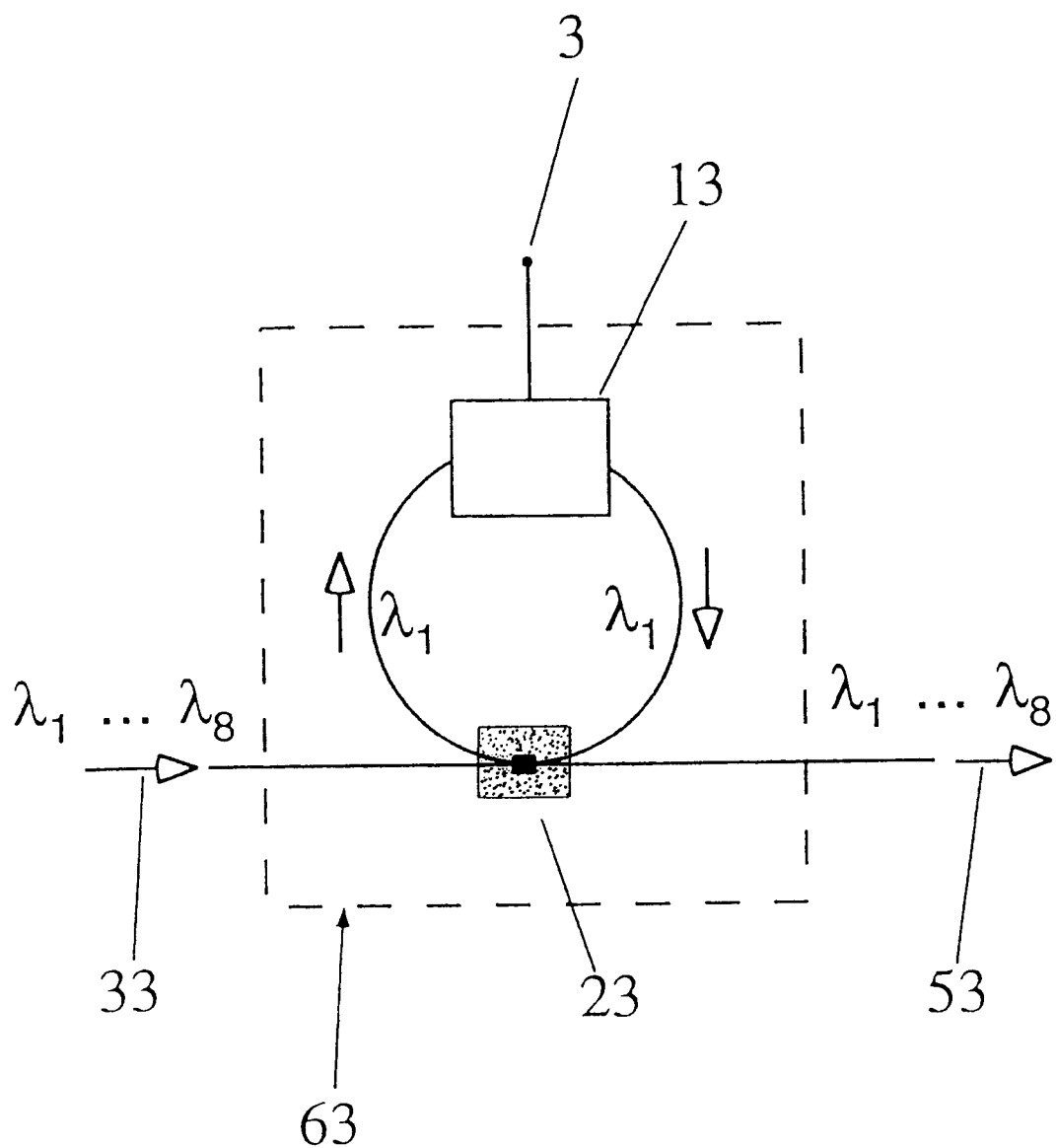
FIG. 6 shows a wavelength insensitive optical element joined to a grating assisted mode coupler.

Erbium doped fiber amplifiers (EDFAs) display a sufficiently broad gain spectrum to enable multiple WDM channels to be amplified simultaneously within a single fiber. However, in some instances it is desirable to route individual wavelength channels to different locations within the optical fiber network. As a result, each wavelength travels a different distance and requires a different level of amplification. A device to amplify only a single wavelength while remaining transparent to all other wavelengths is needed. Such an amplifier 63 is fabricated by combining a grating assisted mode coupler 23 and an EDFA 13 (FIG. 6). The Erbium doped fiber can be fusion spliced between the add and drop ports of the grating assisted mode coupler, for example. In addition, a standard WDM coupler can be inserted into the add/drop loop to couple in 980 nm light from a AlGaAs pump laser, for example. The electrical input 3 adjusts the optical gain (determined by the pump laser power) so that the signal at the wavelength $\lambda_1$ is amplified to the desired level.

EXAMPLE 4

Wavelength Selective Optical Modulator

In another example, the active element 13 of FIG. 6 is an optical modulator. A grating assisted mode coupler 23 can be used to redirect unmodulated optical energy at a particular wavelength into a standard, wavelength insensitive optical modulator 13 and return a modulated signal at this particular wavelength back onto the original fiber with extremely low loss. The is achieved by attaching the drop and add ports of an individual, grating assisted mode coupler to the input and output ports, respectively, of a standard optical modulator. This active device 63 is transparent to all other wavelengths, eliminating the undesirable loss associated with modulating multiple wavelength channels. Optical modulators are commercially available from Uniphase Inc., for example.

EXAMPLE 5

Figure 7:
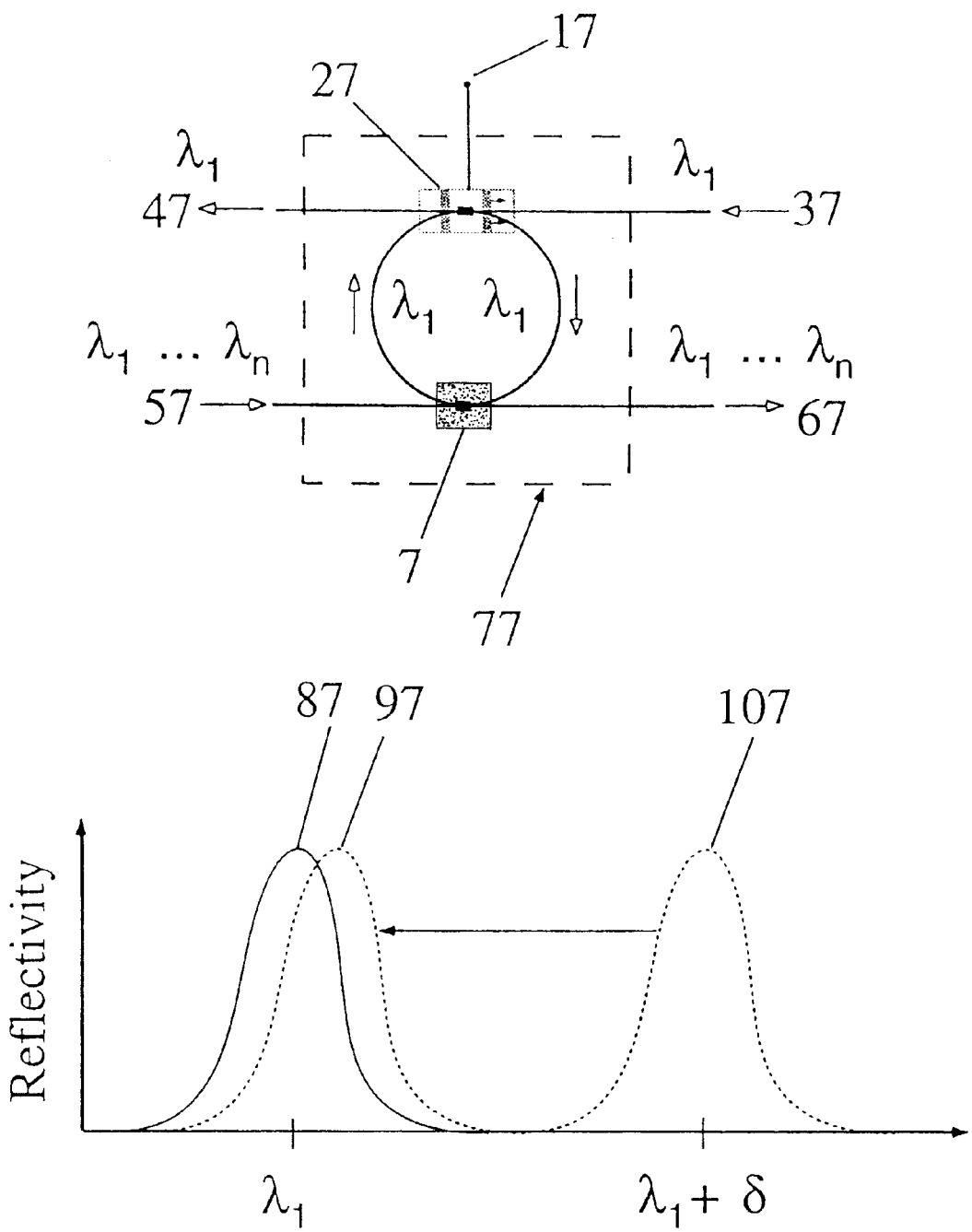
FIG. 7 shows a zero loss, wavelength selective optical switch incorporating a tunable grating assisted mode coupler in tandem with a non-tunable grating assisted mode coupler with nearly the same drop wavelength.

Wavelength Selective Switch Based on a Tunable, Grating Assisted Mode Coupler An all-fiber, wavelength selective switch 77 can be alternately formed by combining a tunable grating assisted mode coupler 27 with a fixed wavelength grating assisted mode coupler 7. This device is expected to display extremely low loss and a fast switching time. Such a device is illustrated in FIG. 7. Tuning is achieved by tensioning the coupler waist. For example, an applied strain of only 0.1% is sufficient to de-tune the Bragg peak 107 1 nm from $\lambda_1+\delta$ to $\lambda_1$. In this state, the Bragg wavelengths of the reflectivity peaks 87 and 97 of the two couplers coincide, so that the second grating assisted mode coupler switches light from the switch input 57 at wavelength $\lambda_1$ into the switch output 47. Because of the symmetrical nature of this device, the switch is bidirectional, and its all-fiber construction leads to an extremely low loss device. The time response to apply tension to the waist is essentially the time for the piezoelectric actuator to expand or contract and launch a longitudinal acoustic wave down the fiber waist. This time is approximately 10 $\mu$s. As a result of the small diameter of the coupler waist, extremely small forces are required to suitably strain the waist. Suitable piezoelectric actuators and controllers are available from Burleigh, Inc., and Polytec P.I.

EXAMPLE 6

WDM Multiwavelength Transmitter

It is well known in the art that mode locked lasers emit light at a series of discrete wavelengths, and these discrete wavelengths can form the basis of a WDM light source [D. U. Noske et al., *Optics Comm.* 108, 297–301 (1994), D. A. Pattison et al., Photosensitivity and quadratic nonlinearity in glass waveguides (Opt. Soc. Amer., Portland, Oregon, 1995), vol. 22, pp. 140–143, J. B. Schlager et al., *Electronics Letters* 27, 2072–2073 (1991), H. Takara et al., *Electron. Lett.* 28, 2274–2275 (1992)]. However, the wavelength components of the mode locked pulse train must be externally modulated independently. This can be achieved with low loss by using multiple narrow bandwidth, grating assisted mode couplers.

The frequency spacing of a mode locked laser is equal to the inverse of the round trip cavity time, $\tau=2$ nL/c. Since the gain spectrum of semiconductor lasers is relatively broad (i.e., 100 nm), a large number of discrete, equally spaced optical frequencies can be generated by mode locking. A standard channel spacing for WDM is 100 GHz. This frequency spacing corresponds to a mode locked laser cavity length of 500 $\mu$m to 1.5 mm. More typical cavity lengths in semiconductor lasers are 100 $\mu$m, producing a channel spacing of 20 GHz. Therefore, an external cavity semiconductor laser may be the preferred mode locked laser source.

Figure 8:
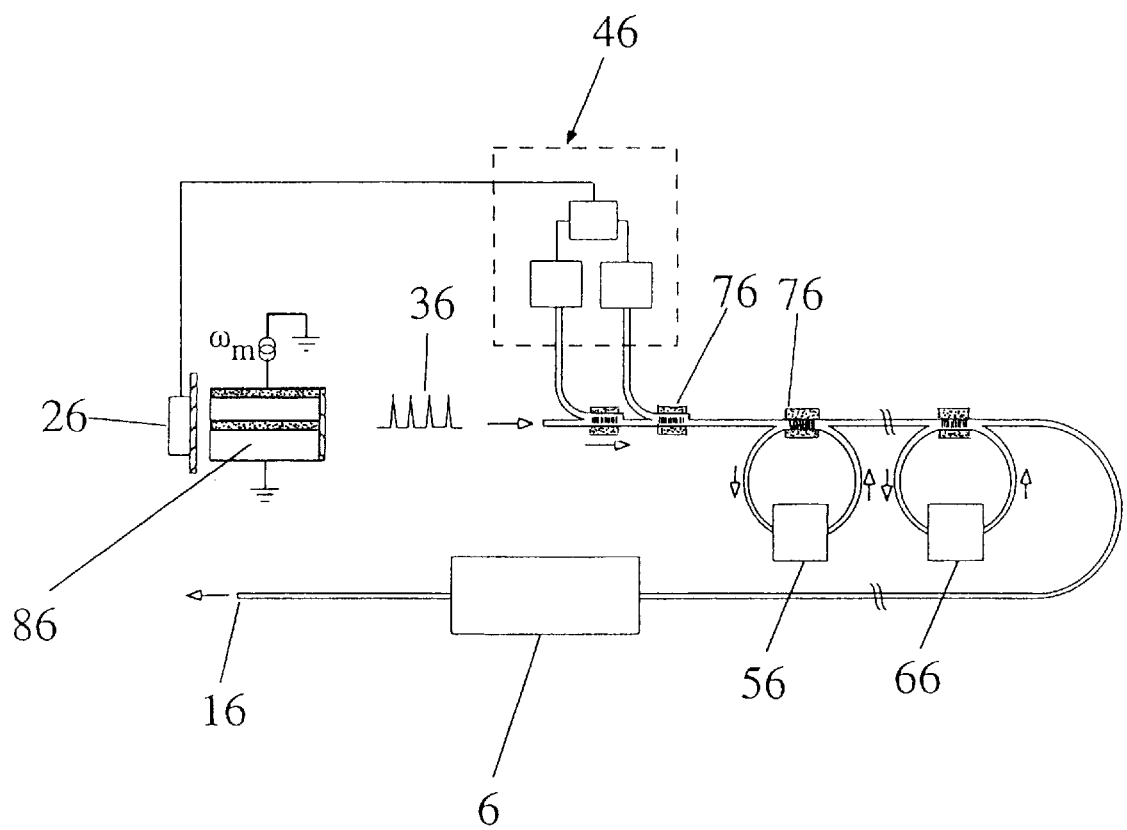
FIG. 8 shows an eight-channel, multi-wavelength WDM source.

The EDFA gain window is approximately 30 nm around 1550 nm. This corresponds to approximately 37 independent wavelength channels with a 0.8 nm channel spacing that can be readily accessed and independently modulated. Presently, an optical device to separate the individual wavelengths in a low loss manner does not exist. However, the grating assisted mode couplers described herein provide a novel method of demultiplexing this optical signal into its wavelength constituents, enabling each wavelength to be externally modulated (and/or amplified), before being multiplexed back onto the output fiber. FIG. 8 illustrates the WDM transmitter subsystem according to this invention. A train of mode locked pulses 36 is generated by a single mode locked laser 26 (e.g., a semiconductor laser) and coupled into an optical fiber or planar waveguide. To stabilize the wavelength of the laser, a wavelength locking system 46 is required, consisting of one or more grating assisted mode couplers used to route the signals at one or more particular wavelengths into one or more detectors. Two detectors are commonly used. The difference of the electrical signals from these detectors is then used as an error signal, which is feed back to a piezoelectric mounted mirror 26 or heater (to change the cavity length and/or optical index of refraction), which stabilizes the laser to a particular set of discrete wavelengths.

The multi-wavelength laser output next travels through a series of grating assisted mode couplers 76 that route each wavelength channel through an independent optical modulator 56 before returning each wavelength channel to the main waveguide 16 by the original grating assisted mode couplers 76. To increase the strength of the signal, all wavelengths may be passed through an optical amplifier 6. Alternately, an optical amplifier may be placed in series with each optical modulator 56, 66. This individually amplifies each wavelength channel. This implementation of a WDM multi-wavelength transmitter has the inherent advantage of producing a series of precisely spaced wavelengths that are automatically and precisely locked to an external reference by monitoring only one of the output wavelengths. The low loss of the grating assisted mode couplers enable them to perform several tasks: separating the various wavelengths for modulation, recombining them in the output fiber, and stabilizing the wavelengths of the laser emission. This laser transmitter realization is also well suited to a planar waveguide fabrication approach because of the relative ease and simplicity of integrating the various components on a substrate.

EXAMPLE 7

Broadly tunable Add/Drop

Figure 9:
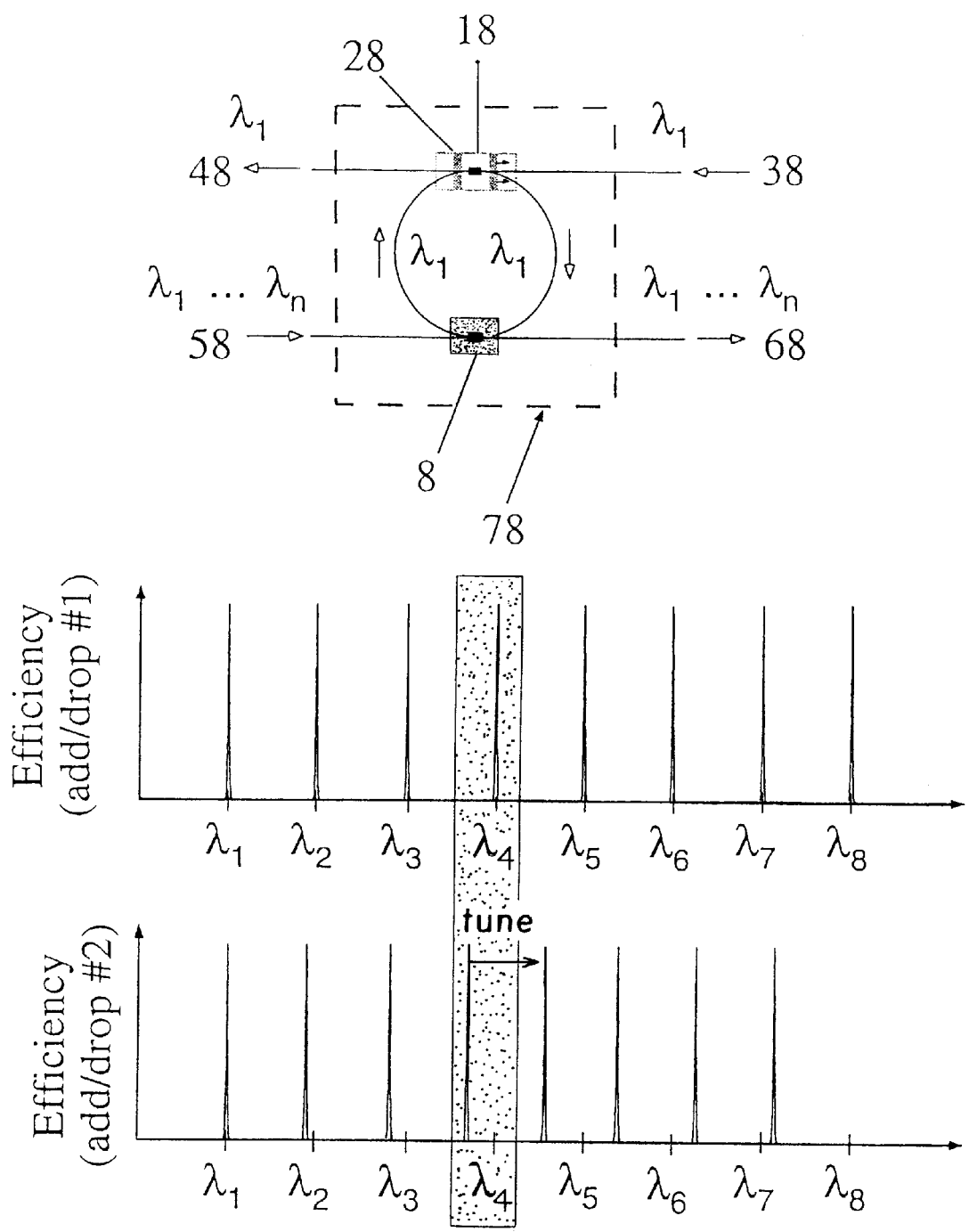
FIG. 9 shows a broadly tunable add/drop filter based on the optical vernier effect.

A broadly tunable add/drop device 78 can be realized by using a vernier type effect [Z. M. Chuang et al., IEEE Photonics Technology Letters, Vol. 5, October 1993 (pp. 1219–1221, Z. M. Chuang et al., IEEE Journal of Quantum Electronics, Vol. 29, April 1993 (pp. 1071–1080)] in a grating assisted mode coupler, as illustrated in FIG. 9. This is achieved by joining the output of one grating assisted mode coupler to the input of another. The first grating assisted mode coupler 8 has multiple gratings recorded in its waist, each at a slightly different wavelength, preferably equal to the standard WDM wavelength channels. This mode coupler is static and attached to a tunable grating assisted mode coupler 28. The tunable grating assisted mode coupler also has multiple gratings recorded in its waist, each at a slightly different wavelength. This set of gratings are at slightly different wavelengths with a slightly different wavelength spacing between adjacent channels than the set of wavelengths of the static grating assisted mode coupler. This second mode coupler is then tuned by an external signal 18 to bring one of its Bragg wavelengths in coincidence with one of the Bragg wavelengths of the first coupler. By further tuning, each wavelength channel in the sequence become matched one at a time to the static grating assisted mode coupler. The final wavelength channel in the sequence may be in excess of 10 nm away from the first wavelength channel, a much larger wavelength departure than that achieved by direct tuning (about 1 nm). The vernier type effect has the advantage of increasing the practical wavelength tuning range.

EXAMPLE 8

Reconfigurable, Wavelength Selective Router #1

Figure 10:
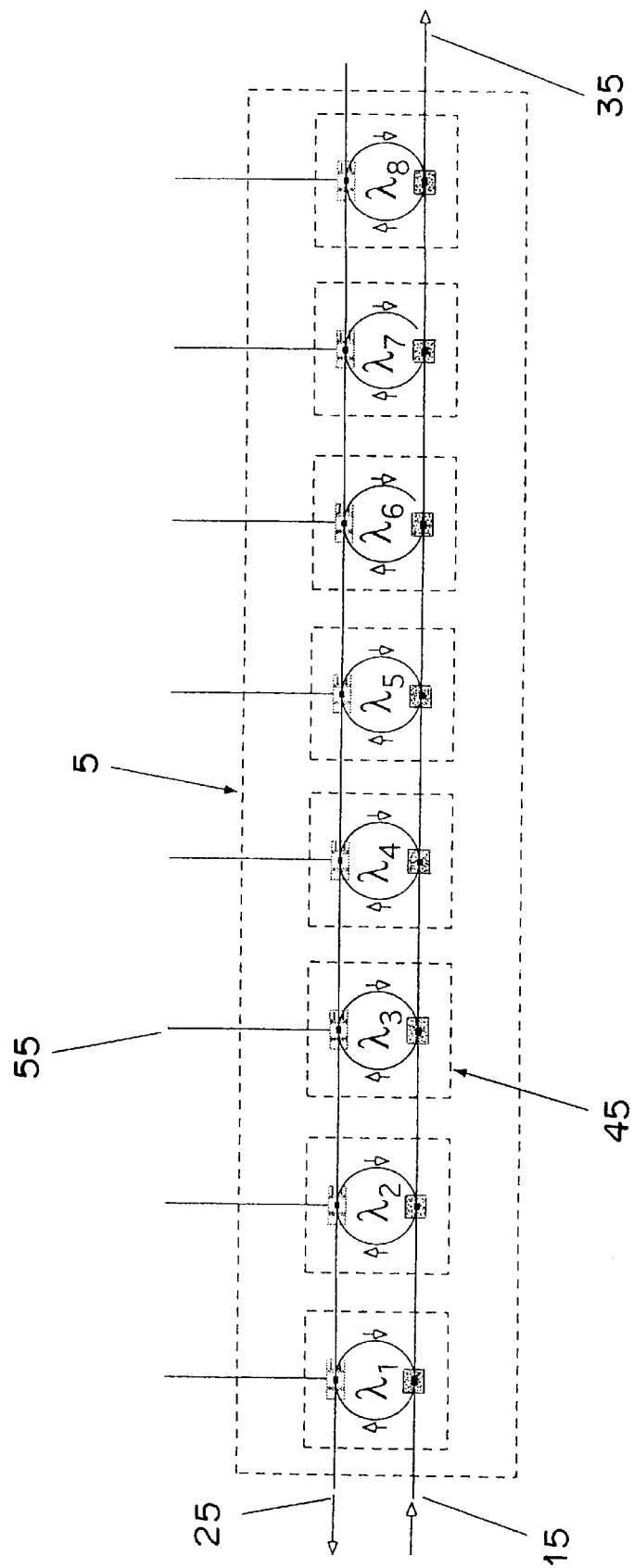
FIG. 10 shows an eight channel, programmable WDM router.

It is desired to have optical subsystems which dynamically route any combination of wavelength channels from one fiber to another, the particular combination of channels to be routed at each instant being determined by an input signal. FIG. 10 illustrates an eight channel programmable router 5 constructed from eight wavelength selective optical switches 45. The wavelength selective optical switches 45 correspond to those devices described in EXAMPLE 4. As described in this section, each wavelength selective optical switch itself consists of a static grating assisted mode coupler in tandem with a dynamic grating assisted mode coupler. Since individual grating assisted mode couplers exhibit extremely low loss, the complete device should exhibit a correspondingly low loss. Light at each wavelength channel can be independently and dynamically routed from the input fiber 15 to either of two output fibers 35, 25 by adjusting the electrical inputs 55 to each optical switch.

EXAMPLE 9

Reconfigurable, Wavelength Selective Router #2

An alternate n channel programmable router can be constructed from N wavelength selective optical switches, as described in EXAMPLE 2, and N grating assisted mode couplers. Each wavelength selective optical switch itself consists of a static grating assisted mode coupler in tandem with a standard wavelength insensitive optical switch. The drop outputs of the optical switches are each connected to a grating assisted mode coupler at the same wavelength, to direct each individual drop channel of a particular wavelength back onto the multiple wavelength output fiber.

EXAMPLE 10

Reconfigurable, Wavelength Selective Router #3

A reconfigurable, wavelength selective router (reconfigurable in the sense that selected wavelengths can controllably be added or dropped) comprises a number of add/drop filters and 2:2 crossover switches. A crossover switch 280 (FIG. 11) has two inputs 283, 289 and two outputs 285, 287, and switches between two states in response to a control signal. In the first switch state 219, switch input one 283 optically communicates with switch output one 287, and switch input two 289 optically communicates with switch output two 285. In the second switch state 221, switch input one 283 optically communicates with switch output two 285, and switch input two 289 optically communicates with switch output one 287. This switch 280 alternates the light signals between the two input terminals and the two output terminals in response to the control signals. Such a switch is readily available commercially from JDS Fitel (SR series, 2:2 switch module) and DiCon, for example.

By combining the crossover switch 207 in two signal loops with separate add/drop filters 205, 209 at the same Bragg wavelength, a single wavelength switching module 203 is provided that intercouples a multiwavelength optical throughput line 210 selectively to an add/drop line 212 on which signals are propagated in the opposite direction. By combining eight of these modules operating at eight different wavelengths, an eight channel router is formed (FIG. 12). Any combination of eight channels can be routed in a programmable and reconfigurable fashion from the input port 213 to the drop port 211, and simultaneously from the add port 215 to the throughput port 217. The desired combination of channels to be routed is assigned by a control unit 291 communicating electrically or optically with the successive crossover switches 207, 293, 295, 297, 299, 301, 303, 305. The add/drop loss experienced by each channel in this arrangement is wavelength dependent because each wavelength added or dropped passes through a different number of add/drop filters.

As an example, consider that, of the eight channels, selected wavelengths $\lambda_3$ and $\lambda_7$ on the throughput to be dropped from the multiwavelength throughput line and different signals at wavelengths $\lambda_3$ and $\lambda_7$ are to be subsequently added. In the drop channels the control unit 291 sets switches 293 and 303 to the add/drop state. The wavelengths $\lambda_3$ and $\lambda_7$ on the throughput line 210 reflect off of the respective wavelength couplers in that line and travel along one-half of the corresponding signal loop, and then travel from the crossover switch into the adjacent half of the other signal loop of the corresponding responsive coupler in the add/drop line 212. Here the selected wavelength is directed towards the terminal 211 which exits the router 206. Signals to be added, also at $\lambda_3$ and $\lambda_7$, are reflected from the responsive coupler into the associated signal loop and propagate back to the coupler through the crossover switch, which is in the add/drop state. There the wavelength signal is again reflected towards the output 217 of the throughput line 210. All wavelengths other than those for which an individual coupler is responsive merely propagate directly through. This arrangement further makes effective use of the bidirectional properties of the wavelength selective couplers, and their capability for switching between ports.

As an additional feature it should be noted that, given the counter-propagating relation of the throughput line 210 to the add/drop line 212, the router can both drop a signal of one wavelength (assume $\lambda_n$) and later add a different signal at wavelength $\lambda_n$. The router need only include two modules at $\lambda_n$, with the drop function being executed along the throughput line prior to the add function.

It will also be appreciated that for some applications it may be preferred to route signal bands, each containing more than one wavelength, and that the present example is fully satisfactory for such purpose, it only being required to have the requisite spectral selectivity in the couplers.

Figure 13:
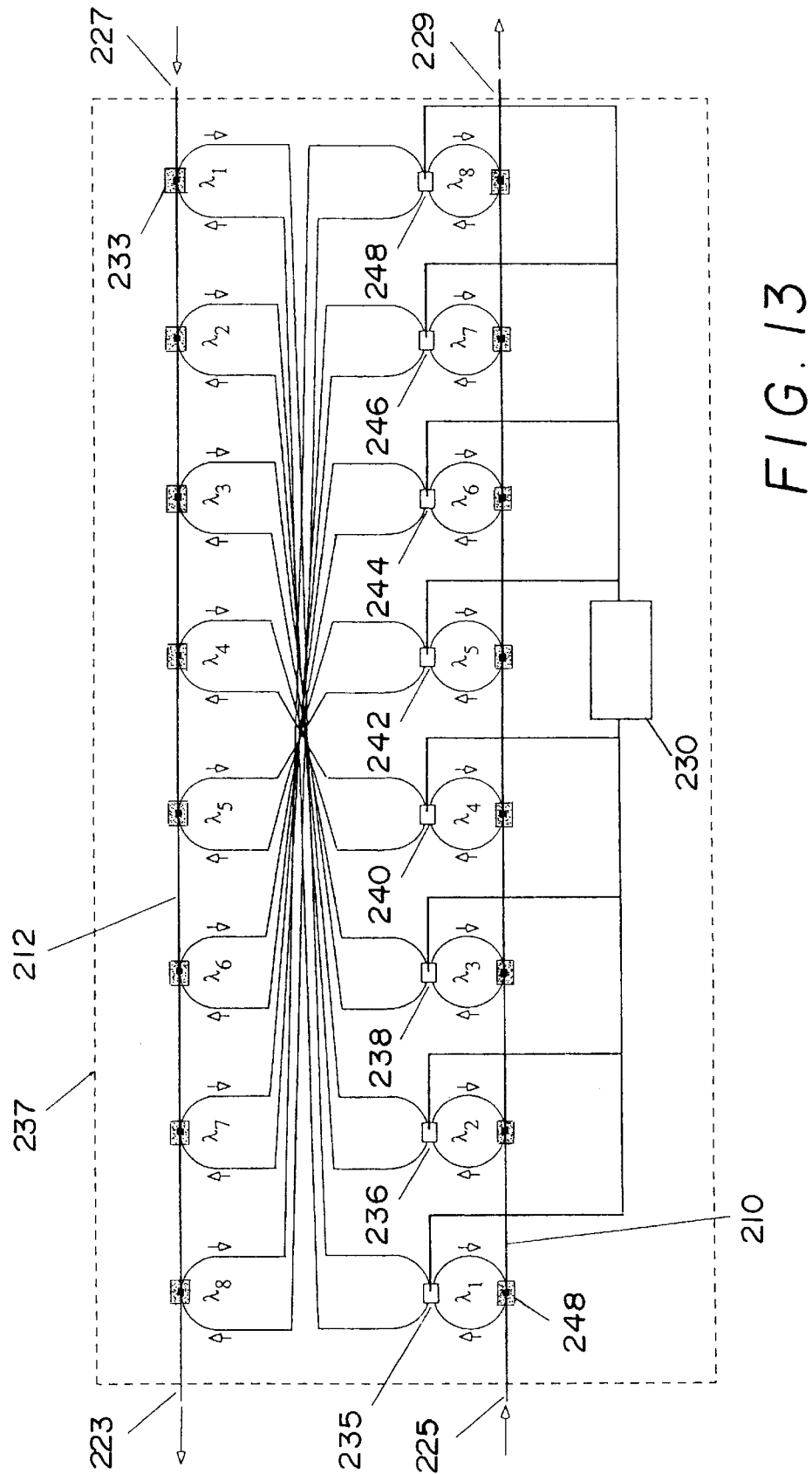
FIG. 13 shows an eight-channel programmable router with equalized loss.

An alternate implementation of an eight channel optical router 237 which offers the advantage of equalized loss for each wavelength channel is illustrated in FIG. 13. In this configuration, for a generalized N channel router, each wavelength channel passes through an equal number (N+1) of add/drop filters, because the wavelengthselective couplers are arranged in inverse order in the two lines are arranged in invers order relative to each other, but still interconnected by paired loops joinint a the crossover switches 235, 236, 238, 240, 242, 244, 246 and 248. For an eight channel router with 0.1 dB loss per add/drop device and 0.3 dB loss per crossover switch, the total loss for any of the wavelength channels is 1.2 dB.

Note that this router also allows any wavelength channel to be dropped off the main fiber and a new channel at the same wavelength to be simultaneously added to the main fiber. In the eight channel example of FIG. 13, any combination of 8 channels can be routed in a programmable and reconfigurable fashion from the input port 225 to the drop port 223, and simultaneously from the add port 227 to the throughput port 229. The desired combination of channels to be routed is assigned by the switch control unit 230 communicating electrically or optically with crossover switches 235, 236, 238, 240, 242, 244, 246, 248.

In these router configurations, consisting of a multitude of wavelength modules comprised individually of two add/drop filters and a switching element, each wavelength channel undergoes one add operation and one drop operation. Therefore, the crosstalk for each wavelength module is twice the crosstalk in dB of the individual wavelength modules. Typical add/drop filters can exhibit <−20 dB of crosstalk at the adjacent wavelength channel, so the net wavelength module exhibits <−40 dB of crosstalk. This crosstalk level also ensures that the coherent or interferometric crosstalk between each dropped channel and a subsequently added channel at the same wavelength lies below the −40 dB level. This has been shown to be highly desirable for many WDM crossconnect applications (S. Danielsen et al., "Analysis of Interferometric Crosstalk in Optical Switch Blocks Using Moment Generating Functions," Photon. Tech. Letters, vol. 10, pp. 1635–1637, 1988). This router architecture achieves a crosstalk level lower than the inherent crosstalk of the individual component elements by combining filters in a novel fashion, thereby relaxing the fabrication tolerances of the individual components.

EXAMPLE 11

Collector Box

Figure 17:
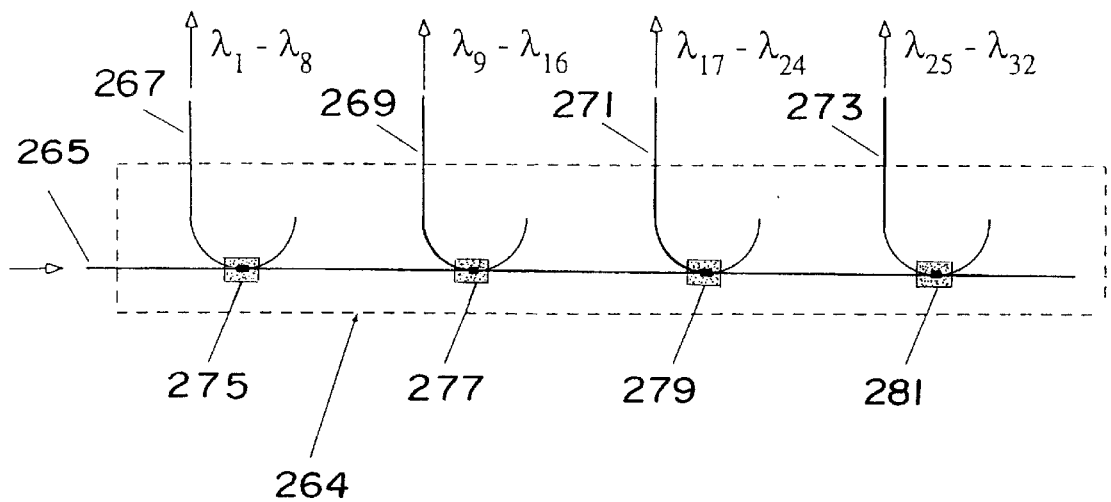
FIG. 17 shows a block diagram of a collector box.

Typical WDM systems have in excess of 16 wavelength channels spaced by 50, 100, or 200 GHz. A demultiplexer which separates incoming wavelength channels into bundles of multiple adjacent channels is often necessary for systems purposes and is called a collector box 264 (FIG. 17). A basic component of such a collector box is an add/drop filter with a broad bandwidth bin that encompasses several adjacent wavelength channels. For example, an add/drop filter for eight channels separated by 100 GHz might have a spectral bandwidth in excess of 6.6 nm and a fast rolloff of reflectivity at the edges of the grating spectral window to minimize crosstalk between the adjacent channels. There is an inter-band gap of only about 1 nm in this example, a region in which wavelength channels should be avoided to prevent undesirable crosstalk or channel loss. This is desirable because it reduces the "deadband" or unutilized portion of the spectral window.

Figure 16:
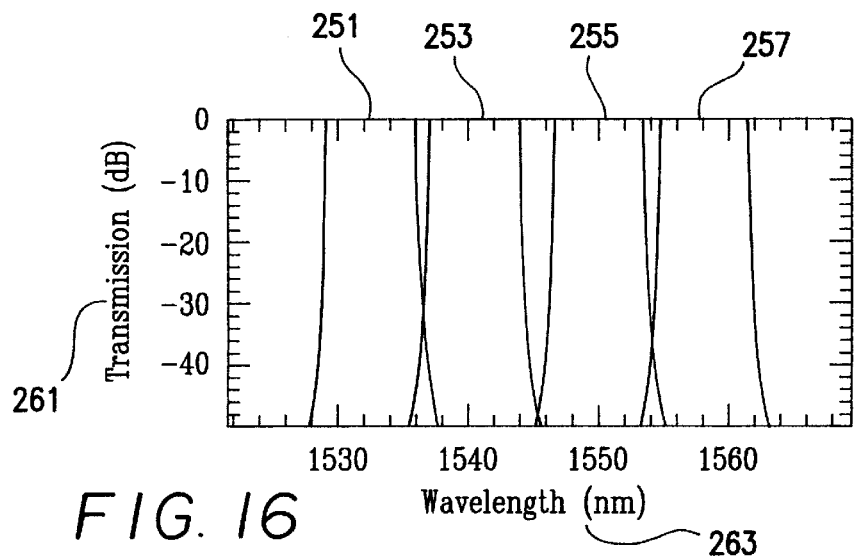
FIG. 16 shows the wavelength spectrum of an example collector box.

The spectra for the individual coupler of a collector box consisting of four add/drop filters at different wavelengths 251, 253, 255, 257 is illustrated in FIG. 16. This particular example further provides for a deadband at the center of the spectral band in which no channel is extracted. This feature may or may not be necessary for some applications. In regards to the wavelength spectra of FIG. 16, the vertical axis is reflectivity in dB 261 and the horizontal axis is wavelength in nm 263. Note that the rapid rolloff of the grating results in a very low crosstalk level 259 at the edges of the filter response.

Figure 14:
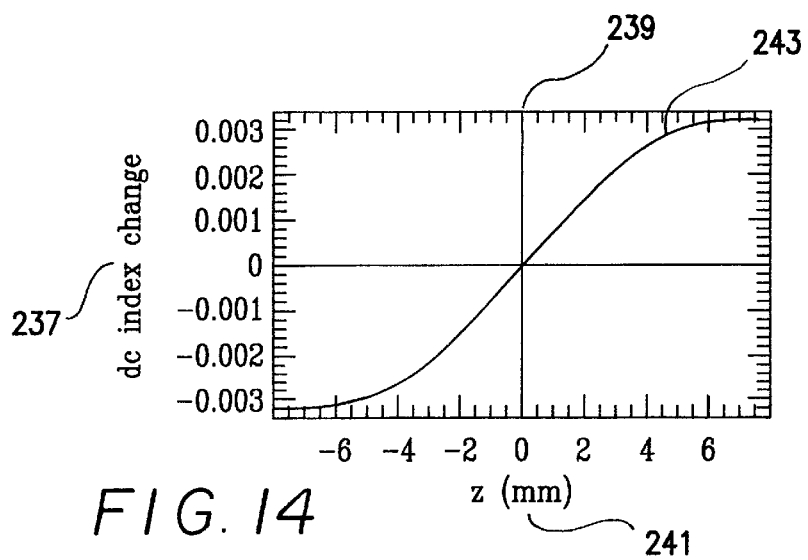
FIG. 14 shows the dc index of refraction or chirp function of a collector box grating.
Figure 15:
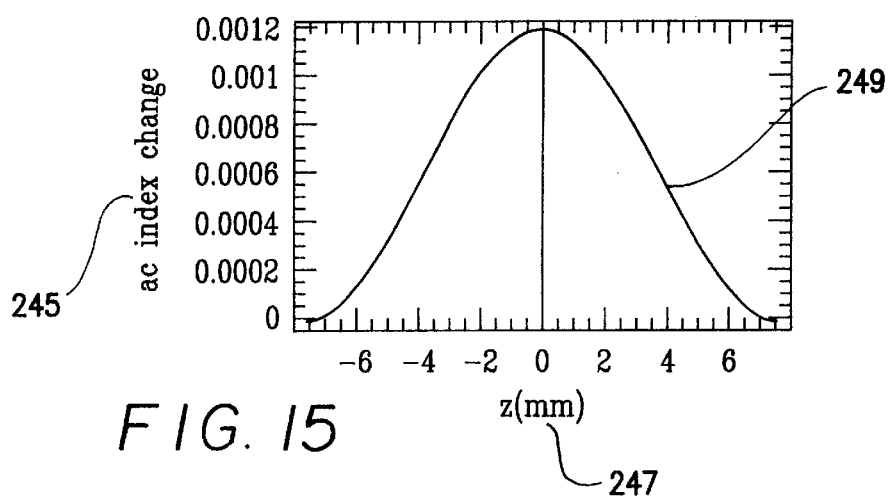
FIG. 15 shows the ac index of refraction or apodization function of a collector box grating.

Such a broad bandwidth grating preserving the fast rolloff at the band edges can be recorded within the coupler waist using a modified linear or hyperbolic tangent-like chirp profile 243 in addition to a cosine squared apodization 249, as illustrated in FIGS. 14 and 15, respectively. The chirp profile 243 is plotted in units of equivalent background index of refraction change 239 as a function of grating position 241 and the apodization profile 249 is plotted in units of index of refraction modulation amplitude 245 as a function of grating position 247. Other chirp and apodization profiles are suitable to produce the desired response. For instance, a higher power cosine or gaussian apodization can be used to maintain the low sideband level. A substantially linear chirp with smoothed edges is suitable to provide the broad spectral bandwidth. Such a profile can be readily produced using the optical exposure system described in the recent patent application U.S. Ser. No. 09/128,477. This profile produces a broad bandwidth grating while preserving the rapid rolloff at the edges of the drop spectrum. For example, a suitable grating for the collector box has an index of refraction modulation envelop Snac(z) and a background index of refraction variation $\delta n_{dc}(z)$ for a grating of length L=15 mm (FIGS. 14 and 15), as follows:

$$\delta n_{dc}(z) = 6.5 \cdot 10^{-3}(z/L + \pi/20 \sin(2\pi z/L))$$

$$\delta n_{ac}(z0 = 1.2 \cdot 10^{-3} \cos^2(\pi z/L).$$

These index of refraction profiles produce approximately a 6.6 nm bandpass at the −0.5 dB level with >20 dB of add/drop channel rejection and a 7 nm bandpass at the −25 dB level. The application of apodization reduces the interbin crosstalk and the chirp broadens the grating spectral width while preserving the rapid roll-off of reflectivity at the edges of the grating. Note that the chirp is essentially linear across the center of the grating, and the slope of the chirp at the edges of the grating goes to zero. The gradual reduction of chirp at the physical edges of the grating provide a rapid spectral roll-off of reflectivity, even for a chirped grating.

In this particular example, the chirp is induced by varying the dc index of refraction along the grating length; however, chirp can also be produced by recording an index of refraction grating with a spatially varying period along the grating length. A phase mask with the following mask grating period variation equivalently produces such a grating response:

$$\Lambda_{mask}(z) = \Lambda_0(1 - 0.0065(z/L + \pi/20 \sin(2\pi z/L)))/n_{\mathit{eff}}$$

where $\Lambda_0$ is the nominal mask period, L is the length of the grating and $n_{\mathit{eff}}$ is the effective index of refraction of the coupler waist at the drop wavelength. For a grating around 1550 nm, the typical mask period for a coupler grating is 1090 nm. The mask period is dependent on the target drop wavelength and the effective index of refraction. The effective index of refraction is primarily dependent on the diameter of the waist region. Such an unapodized phase mask can be illuminated in a dual beam manner to produce an apodized grating.

In a further example of a four channel collector box, in which blocks of 8 channels are demultiplexed into four separate fibers, the mask period is chosen, based on the coupler size and grating angle, to lie at the following center wavelengths:

| Channel bins: | Center wavelength: |
| --- | --- |
| 1530.33–1535.04 nm | 1532.69 nm |
| 1538.19–1542.94 nm | 1540.57 nm |
| 1547.72–1552.52 nm | 1550.12 nm |
| 1555.75–1560.61 nm | 1558.18 nm |

The spectrum of such a collector box is illustrated in FIG. 16. This is only one example of a broad range of collector boxes that may be configured for different wavelength bundles and different routing functions.

EXAMPLE 12

Bandpass Filters

Figure 18:
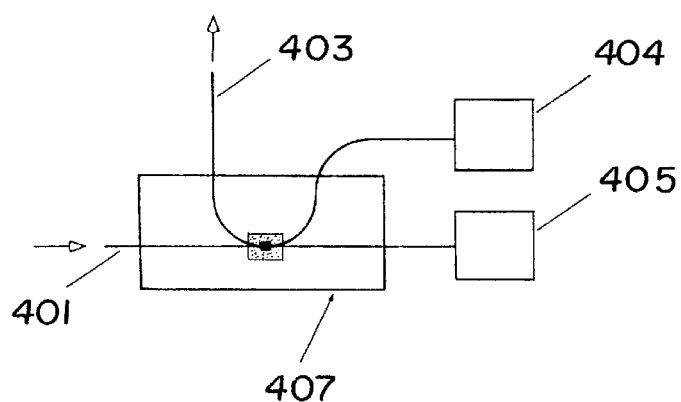
FIG. 18 shows a diagram of a bandpass filter.

An add/drop filter operates as an optical bandpass filter 407 by configuring it as shown in FIG. 18 and recording a reflection grating with the desired response. The optical signal at one or more particular wavelengths in launched down the input fiber 401, is reflected by a grating responsive to the particular wavelengths lying within the optical bandpass or bandpasses and exits the output fiber 403. Those wavelengths lying outside the optical bandpass or bandpasses propagate through the coupler and end at a low backreflection termination 405 which dissipates the optical energy without reflecting light back into the fiber. To minimize spurious reflections the remaining port 404 also is prepared as a low backreflection termination. The low backreflection termination is produced by angle cleaving the fiber, by potting in an index matching material such as epoxy or gel, by antireflection coating the cleaved fiber end face, or by splicing to a fiberoptic isolator.

This bandpass filter, based on a grating assisted mode coupler, is extremely low loss and is imprinted with a grating that is relatively straightforward to produce, in contrast to bandpass filters of the prior art. For example, L. Zhang et al., "Fabrication of high-rejection-low-loss single-passband filters in cladding depressed fiber by the chirped-grating concatenation method," Optics Letters, Vol. 23, No. 21, pp. 1665–1667, describes concatenating multiple chirped fiber gratings to form a single passband filter with a broad stopband. The use of multiple gratings increases the complexity and cost of such a device.

Bandpass filters are necessary, for example, to attenuate the undesired light signal produced by amplified spontaneous emission (ASE) arising from optical amplifiers such as EDFAs in the 1530–1565 nm band. This filter blocks all light at wavelengths lying between adjacent channels. The loss outside the bandpass is preferably >20 dB and the loss within the bandpass is preferably <0.5 dB.

It should now be appreciated that the present invention and all of its exemplifications provide a wavelength selective optical coupler displaying a variety of advantages. The wavelength selective optical fiber devices disclosed herein have a variety of applications. In one application, the couplers are combined with optical switches in an arrangement that produces a reconfigurable optical router. In another application, the couplers are imprinted with broad spectral bandwidth gratings to produce a collector box. In another application, the couplers are prepared in a manner that produces a bandpass filter. A person understanding this invention may now conceive of alternative structures and embodiments or variations of the above. All of those which fall within the scope of the claims appended hereto are considered to be part of the present invention.

We claim:

1. A system for switching of individual optical wavelength bands in a multi-wavelength optical transmission system comprising:

a plurality of non-evanescent wavelength selective optical couplers each having two pairs of terminals coupled to a common reduced diameter waist region including a periodic grating which diverts with low insertion loss signals of selected wavelengths received at one terminal of a pair to the other terminal of the pair, while passing through signals of other than the selected wavelengths, thereby both bandpass filtering and redirecting signals, and circuit connections including a multi-wavelength line coupled to all the couplers at selected terminals of the couplers, the couplers being arrayed in a selected pattern of wavelength selectivity to selectively redistribute the selected wavelength signals in a chosen manner.

2. A system as set forth in claim 1 above, including in addition an add/drop optical line, each of the lines including a series of couplers in which pairs of couplers in the different lines are selective at like wavelengths bands, and the system further includes crossover switches interconnecting the paired couplers, and a controller unit coupled to operate the crossover switches for routing the signals in selected wavelength bands.

3. A system as set forth in claim 1 above, wherein the couplers are connected in series to the multi-wavelength line and the couplers each are characterized by gratings providing passbands for diverted signal wavelengths which encompass more than one discrete signal bearing wavelength and which have sharp rolloff characteristics at the edges of the passbands, there being substantially less spectral gap between the passbands than the width of the passbands, to provide a collector box for demultiplexing functions.

4. The method of adding and dropping signals of selected wavelength bands to and from a main transmission line for optical signals comprising the steps of:

propagating add/drop wavelength bands along a separate path other than the main transmission line;

establishing first wavelength band selective loops at serial positions along the main transmission line to return signals in the loop to the line if not diverted;

establishing second wavelength band selective loops at serial positions along the add/drop path to return signals in the loop to the path if not diverted; and diverting signals from one or more selected wavelengths of the first loops to corresponding wavelength ones of the second loops to add and/or drop wavelength bands to or from the main transmission line.

5. The method as set forth in claim 4 above, further including the steps of strongly attenuating signals outside the selected wavelength bands in each of the loops, relative to signals within the selected wavelength bands, and propagating the diverted signals through two loops which filter the signals at the selected wavelength bands twice.

6. The method as set forth in claim 5 above, wherein the wavelength bands comprise individual discrete signal-bearing wavelengths.

7. The method as set forth in claim 5 above, wherein the wavelength bands each comprise a group greater than one of discrete signal bearing wavelengths.

8. The method as set forth in claim 5 above, wherein the wavelength band selective loops number at least two at different serial positions along the main transmission line that are of the same chosen wavelength band such that signals of the chosen wavelength band in the main transmission line can be dropped at a first position and other signals of the chosen wavelength band can later be added at a second position.

9. A programmable router for optical waveguide systems comprising:
   a first optical waveguide line having add and drop terminals for propagating signals of different wavelengths to be controllably routed;
   a second optical waveguide line for propagating selectively combined ones of the signals at different wavelengths;
   a plurality of optical waveguide shunting units disposed in parallel between the first and second optical waveguide lines, each of the shunting units including a controllable crossover switch and a pair of wavelength selective optical filters, each filter of a different pair of the optical waveguide lines being in a different line and the filters of each pair each being responsive to a chosen wavelength, and
   a routing control system for operating the crossover switches to selectively add and drop wavelengths at the different units.

10. A router as set forth in claim 9 above, wherein the wavelengths to be routed onto the second optical waveguide line comprise discrete individual signal wavelengths.

11. A router as set forth in claim 10 above, wherein the wavelength selective optical filters are grating enhanced couplers reflecting a selected optical wavelength and wherein the controllable switches comprise dual input and dual output switches having one input and one output coupled across each coupler.

12. A router as set forth in claim 11 above, wherein the grating enhanced couplers pass wavelengths outside the selected wavelength band substantially attenuated and wherein the shunting units pass the selected wavelength through two couplers selective at the same wavelength for double pass filtering of the selected wavelength.

13. A router as set forth in claim 11 above, wherein add/drop signals are propagated on the first optical line in counter-direction to signals on the second optical line such that a dropped signal at a selected wavelength may be supplanted by an added signal at the same wavelength.

14. A router as set forth in claim 13 above, wherein the shunting units intercouple like wavelength couplers arranged in sequentially changing wavelength on each line.

15. A router as set forth in claim 13 above, wherein the shunting units intercouple like wavelength couplers arranged in oppositely changing wavelength sequences on the two lines such that add/drop signals transferred between the two lines traverse the same number of couplers independent of the routing function used.

16. A programmable, wavelength selective router which directs a programmable combination of wavelength channels between optical waveguides, comprising:
   a first optical waveguide;
   a second optical waveguide;
   a first plurality of grating assisted mode couplers characterized by different add/drop wavelengths, each having an input, throughput, add and drop port, the input and throughput ports of said first plurality of grating assisted mode couplers being disposed in serial fashion along said first optical waveguide;
   a second plurality of grating assisted mode couplers characterized by different add/drop wavelengths, each having an input, throughput, add and drop port, the input and throughput ports of said second plurality of grating assisted mode couplers being disposed in serial fashion along said second optical waveguide;
   a plurality of crossover optical switches, each having a first and second input and a first and second output,
   wherein the drop ports of the first plurality of grating assisted mode couplers are individually coupled to the first switch inputs, the add ports of the first plurality of grating assisted mode couplers are individually coupled to the second switch inputs, the drop ports of the second plurality of grating assisted mode couplers are individually coupled to the second switch outputs and the add ports of the second plurality of grating assisted mode couplers are individually coupled to the first switch outputs.

17. A programmable router in accordance with claim 16 comprising further:
   a number N of grating assisted mode couplers in the first plurality and N in the second plurality, and
   N crossover optical switches, wherein N is equal for four or eight.

18. A programmable router in accordance with claim 16 whereby the add/drop wavelengths of each pair of grating assisted mode couplers coupled to a particular crossover switch are equal to within 0.1 nm, and wherein the frequency separation between individual add/drop wavelengths is approximately 50, 100 or 200 GHz.

19. A programmable router in accordance with claim 16 wherein the grating assisted mode couplers are cross-connected in a manner that equalizes the loss experienced by each wavelength channel.

20. A programmable router for optical waveguide systems having an add/drop line to and from which different wavelengths are combined or extracted from a common throughput line, comprising:
   a number of 2:2 optical crossover switches, each controllable to pass or divert input signals to different outputs in a symmetrical manner;
   a number of wavelength selective add/drop filters, each being reflective at a different selected wavelength, a first set thereof being coupled into the add/drop line on one side and a first input/output pair of a different optical switch on the other side, and those of a second set being coupled into the throughput line on one side and the second input/output pair of a different optical switch on the other side, the interconnections of the first set being such that the channels at different add/drop wavelengths are propagated through a like number of add/drop filters regardless of routing,
   and a control system for selecting the states of the optical switches.

21. A router for optical signals comprising:
   a main optical fiber;
   an add/drop optical filter in parallel with the main optical fiber, optical wavelength signals with different wavelengths being propagated in opposite directions on the two fibers; and
   a plurality of cross-switching units serially interconnecting the two fibers, each responsive to a selected wavelength and propagating other wavelengths along the two fibers, each cross-switching unit being coupled to controllably change the wavelengths propagated on the main fiber by adding selected wavelength signals from and dropping selected wavelength signals to the add/drop optical fiber.

22. A router as set forth in claim 21 above, wherein the cross-switching units include at least two units that are responsive to the same wavelength, and so positioned along the main optical fiber such that a selected wavelength signal that is dropped at one unit can be added at another.

23. A router as set forth in claim 22 above, including in addition a routing control system for operating the cross-switching units to add and drop selected wavelengths at the main optical fiber.

24. A router as set forth in claim 23 above, wherein the cross-switching units include optical switches having paired terminals that are being controlled to transfer signals between terminals of one pair and terminals of another pair, and wherein the cross-switching units include wavelength responsive couplers having two paired terminals, and nonevanescent interchange regions incorporating wavelength selective reflective gratings whose periodicities are selected to reflect the selected wavelengths to the adjacent terminal of the same pair while propagating other wavelengths to a terminal of the opposite pair, and the cross-switching units and the couplers are interconnected such that the couplers redundantly diminish the sidebands of the selected wavelengths.

25. A collector box system for separating groups of channels to be added or dropped in an optical wavelength band employing a multitude of grating assisted couplers joined in series comprising:
an optical waveguide; and
a plurality of grating assisted mode couplers, each having an input, throughput, add and drop port, the input and throughput ports of said first plurality of grating assisted mode couplers being disposed in serial fashion along said optical waveguide and being imprinted with an apodized and chirped grating selected to add and drop a group of sequentially adjacent wavelength channels, each encompassing a different wavelength subband within the overall band.

26. A collector box in accordance with claim 25 wherein the number of sequentially adjacent wavelength channels added or dropped is in the range of 4 to 8, and wherein the frequency spacing of sequentially adjacent wavelength channels is 50, 100 or 200 GHz.

27. A collector box in accordance with claim 25 wherein the wavelengths of said wavelength channels are in the range of 1500 to 1600 nm, wherein the subbands are about 6.6 nm in width, and wherein the spacing between wavelength band edges is less than 2 nm, and wherein the cutoff characteristic of each wavelength band is such that the crosstalk level, or reflectivity of a first grating at the center wavelength of the nearest adjacent wavelength channel outside the wavelength band to be added or dropped, is below −25 dB at less than 1 nm from the wavelength band edge.

28. A network for branching incoming channels in an optical waveguide communication system having many channels into channel subsets each having a number of adjacent closely spaced wavelength channels comprising:
a system of grating assisted add/drop filter units, each coupled to receive the total set of channels and each unit responsive to wavelengths falling only within a selected wavelength band to output such wavelengths as a subset of channels, wherein each filter unit comprises a group of filter units, each having a grating that is selective to a spectral band of wavelengths, and with adjacent band edges exhibiting less than −25 dB crosstalk at crossover points between adjacent bands.

29. A network as set forth in claim 28 above, wherein the gratings have apodized grating responses providing greater than 20 dB add/drop rejection within of the passband.

30. A network as set forth in claim 28 above, wherein the filter units each comprise a number of add/drop filters having reflection gratings, and the grating functions each comprise a band chirping function and an apodization function.

31. A signal switching unit for selectively directing signals at optical wavelengths from a first optical wave transmission line to a second wave transmission line comprising:
an optical switch having two terminal pairs and selectively controllable to pass signals through from one terminal of a pair to one terminal of the other pair, or alternatively between terminals of the same pair;
first and second reflective optical signal couplers, each having two pairs of terminals and each reflecting a selected wavelength band received at one terminal of a pair to the other terminal of the pair, and passing other wavelengths through to a terminal of the other pair, each of the couplers being interspersed in a different one of the wave transmission lines at a first set of pass-through terminals, the couplers being bidirectional and the selected wavelength bands being alike, and
first and second signal loops, each interconnecting one pass-through terminal set of the optical switch to a pass-through set of a different coupler,
whereby on operation of the switch a selected wavelength band on one of the wave transmission lines can be directed to the other of the wave transmission lines.

32. A switching unit as set forth in claim 31 above, wherein one wave transmission line comprises an add/drop line for a selected wavelength band and the other wave transmission line comprises an input line for multiple wavelengths within the same wavelength band.

33. A switching unit as set forth in claim 32 above, wherein the optical switch is responsive to a substantially wider wavelength band than the signal couplers.

34. A switching unit as set forth in claim 33 above, wherein there are a plurality of switching units coupled between the add/drop line and the input line, wherein each of the signal couplers comprises a grating assisted reflective filter responsive to a selected narrow wavelength band, the bands being different for each unit, and wherein a controller is coupled to the optical switches to provide selected add/drop incremental wavelength band modifications to the input signal.

35. A Bragg grating enhanced coupler including a nonevanescent waist region with an index of refraction grating therein, the coupler having pairs of terminals at opposite ends of the waist region wherein the index of refraction grating has a grating periodicity in the waist region having at least two variations, a first variation distributing wavelength responsiveness over a selected wavelength band, and a second independent variation in which wavelength responsiveness terminates abruptly at the limits of the wavelength band, whereby the wavelength responsiveness is substantially uniform within the selected band and has a sharp cut off characteristic at the edges of the band.

36. A coupler in accordance with claim 35 above, wherein the first variation is in accordance with:

$$\delta n_{dc}(z) = 6.5 \ 10^{-3}(z/L + \pi/20 \sin(2 \ \pi z/L))$$

and the second variation is in accordance with:

$$\delta n_{ac}(z) = 1.2 \ 10^{-3} \cos^2(\pi z/L)$$

where $\delta n_{ac}(z)$ is the index of refraction modulation envelope and $\delta n_{dc}(z)$ is the background index of refraction variation, z is the position along the grating and L is the grating length.

37. A coupler in accordance with claim 36 above, wherein the length L of the grating is about 15 mm, and wherein the coupler has a responsiveness band of at least about 6 nm and wherein the responsiveness drops to at least −25 dB at 1 nm outside the band limits.

38. A band pass filter for optical signals comprising:

a coupler comprising a pair of optical fibers with a reduced diameter waist region in which the fibers are joined longitudinally in a non-evanescent merged region, the waist region including a grating reflective at a selected wavelength and the coupler including pairs of terminals at each end of the waist region, and the waist region reflecting signals of a selected wavelength input at a first terminal at one end to the other terminal at the same end and passing other wavelengths through to a throughput terminal at the other end, and an optical termination coupled to the throughput terminal.

* * * * *